United States Patent
Khan et al.

(10) Patent No.: US 11,313,939 B2
(45) Date of Patent: Apr. 26, 2022

(54) SELF-CORRECTION OF A RADIO MAP

(71) Applicant: HERE Global B.V., Eindhoven (NL)

(72) Inventors: Muhammad Irshan Khan, Tampere (FI); Jari Tapani Syrjärinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 105 days.

(21) Appl. No.: 16/638,497

(22) PCT Filed: Aug. 14, 2017

(86) PCT No.: PCT/EP2017/070625
§ 371 (c)(1),
(2) Date: Feb. 12, 2020

(87) PCT Pub. No.: WO2019/034238
PCT Pub. Date: Feb. 21, 2019

(65) Prior Publication Data
US 2020/0300962 A1  Sep. 24, 2020

(51) Int. Cl.
| | |
|---|---|
| *H04W 24/00* | (2009.01) |
| *G01S 5/02* | (2010.01) |
| *H04W 4/33* | (2018.01) |
| *H04W 64/00* | (2009.01) |

(52) U.S. Cl.
CPC ........... *G01S 5/02527* (2020.05); *H04W 4/33* (2018.02); *H04W 64/003* (2013.01)

(58) Field of Classification Search
CPC ... G01S 5/01; G01S 5/011; G01S 5/02; G01S 5/0244; G01S 5/02521; G01S 5/0252;
(Continued)

(56) References Cited

U.S. PATENT DOCUMENTS

| | | |
|---|---|---|
| 7,567,822 B2 | 7/2009 | Mart et al. |
| 8,140,094 B2 | 3/2012 | Morgan et al. |
| | (Continued) | |

FOREIGN PATENT DOCUMENTS

| | | |
|---|---|---|
| WO | WO 2012/052700 A1 | 4/2012 |
| WO | WO 2015/150344 A1 | 10/2015 |
| WO | WO 2016/087008 A1 | 6/2016 |

OTHER PUBLICATIONS

International Search Report and Written Opinion for Application No. PCT/EP2017/070625 dated May 9, 2018, 13 pages.
(Continued)

*Primary Examiner* — Shantell L Heiber
(74) *Attorney, Agent, or Firm* — Alston & Bird LLP

(57) ABSTRACT

A method, apparatus and system are provided for determining displacement information for a radio node. In a method respective position information is obtained that is indicative of a position of a respective radio node. The method determines the position of the respective radio node based on respective radio measurements of further respective radio nodes surrounding the respective radio node and on further respective radio measurements gathered by the respective radio node. The respective signals are sent by the one or more respective radio nodes surrounding the respective radio node. The method also determines displacement information based on the respective position information that is obtained and the determined position of the respective radio node. The displacement information is indicative of a displacement of the respective radio node if the determined position of the respective radio node differs from the position of the respective radio node represented by the obtained position information.

20 Claims, 10 Drawing Sheets

(58) Field of Classification Search
CPC .............. G01S 5/0295; G01S 5/02524; H04W 64/003; H04W 4/029
See application file for complete search history.

(56) References Cited

U.S. PATENT DOCUMENTS

| | | | |
|---|---|---|---|
| 8,743,759 | B2 | 6/2014 | Viswanathan et al. |
| 9,002,373 | B2 | 4/2015 | Marti et al. |
| 9,030,963 | B2* | 5/2015 | Mahasenan ......... H04W 64/003 370/254 |
| 2011/0012780 | A1 | 1/2011 | Alizadeh-Shabdiz |
| 2011/0128124 | A1* | 6/2011 | Im ........................ G01S 5/0252 340/8.1 |
| 2012/0122475 | A1* | 5/2012 | Ahmed ................ G01S 5/0242 455/456.1 |
| 2013/0235749 | A1 | 9/2013 | Cho et al. |
| 2015/0080013 | A1* | 3/2015 | Venkatraman ........ G01S 5/0236 455/456.1 |
| 2015/0126215 | A1* | 5/2015 | Pandey ................ G01S 5/0242 455/456.1 |
| 2015/0373562 | A1 | 12/2015 | Wirola et al. |
| 2017/0048678 | A1* | 2/2017 | Hong ...................... H04W 4/30 |
| 2018/0137729 | A1* | 5/2018 | Bottazzi ................ H04W 4/021 |

OTHER PUBLICATIONS

Atia, M. M. et al., *Dynamic Online-Calibrated Radio Maps for Indoor Positioning in Wireless Local Area Networks,* IEEE Transaction on Mobile Computing, vol. 12, Issue 9 (Sep. 2013) 1774-1787.

\* cited by examiner

○ Correct location
● Estimated location

* Stored location
+ beacon estimated location using fingerprints
○ Fingerprint, color describes RSS value at the location fingerprint ○ Correct location
● Estimated location

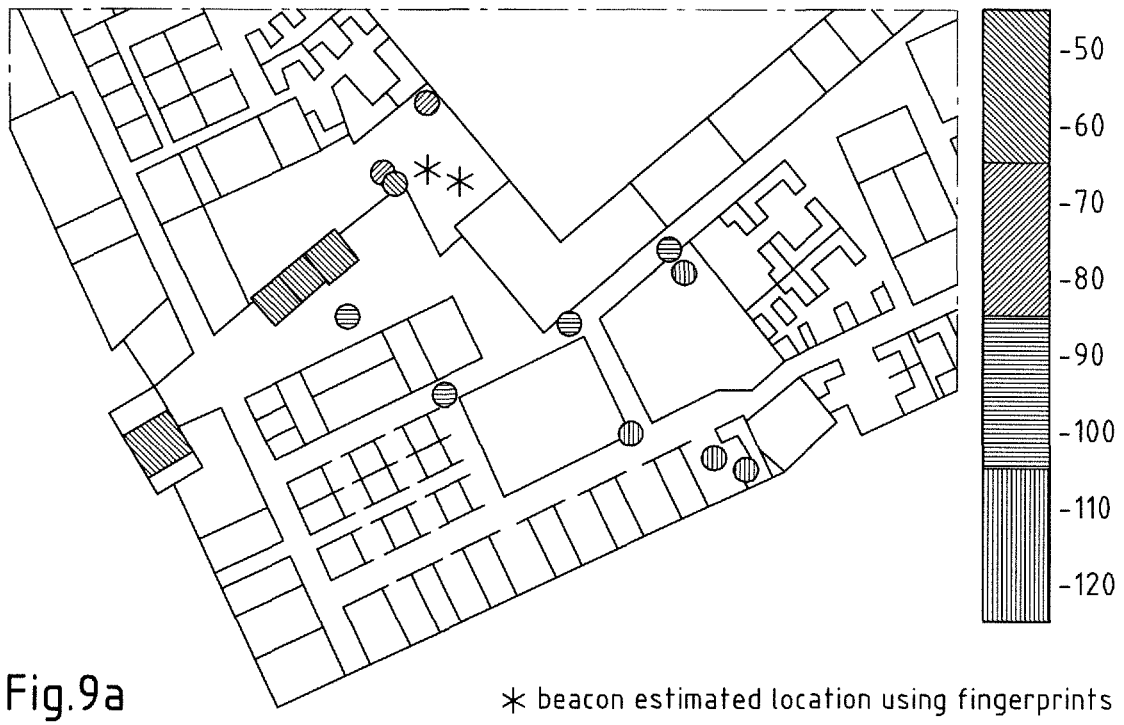
Fig.9a  ✶ beacon estimated location using fingerprints
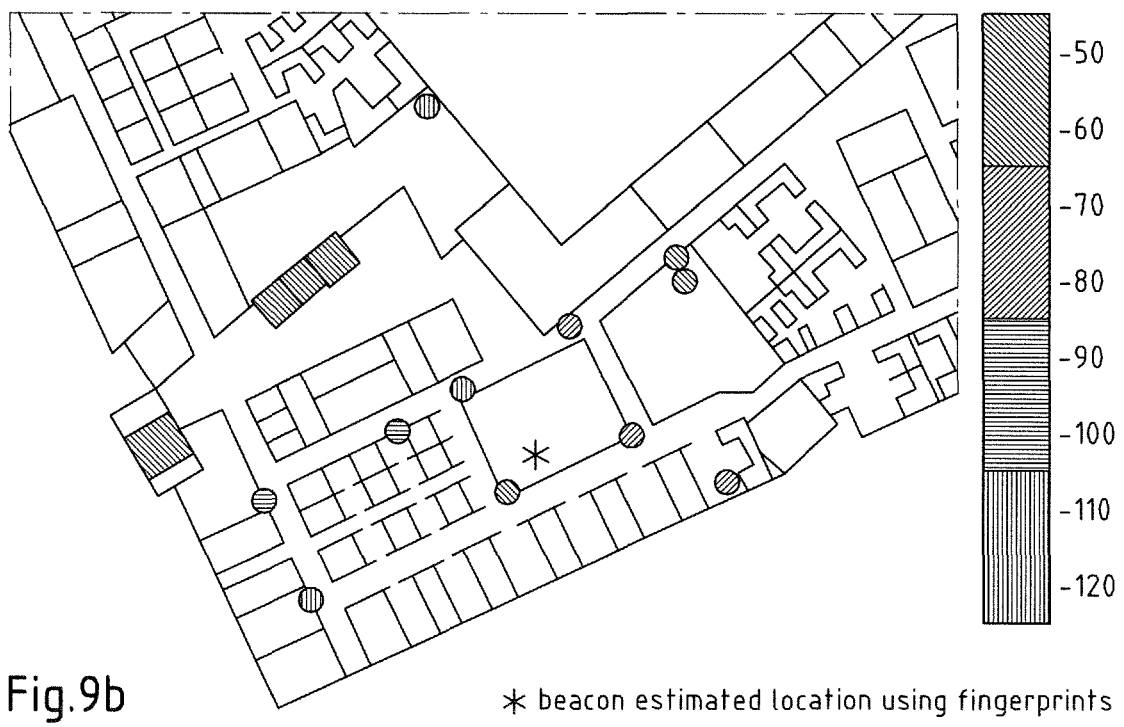
Fig.9b  ✶ beacon estimated location using fingerprints

SELF-CORRECTION OF A RADIO MAP

CROSS-REFERENCE TO RELATED APPLICATIONS

This application is a national phase entry of International Application No. PCT/EP2017/070625, filed Aug. 14, 2017, the entire contents of which are incorporated herein by reference.

FIELD

The following disclosure relates to the field of indoor navigation respectively positioning systems, or more particularly relates to systems, apparatuses, and methods for determining a displacement of radio nodes of such systems.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (Global Positioning System (GPS)-like short-range beacons), ultrasound positioning, Bluetooth Low Energy (BLE) signals (e.g. High-Accuracy Indoor Positioning, HAIP) and Wi-Fi fingerprinting. What is typical to these solutions is that they require either deployment of totally new infrastructure (radio nodes or radio beacons, or tags to name but a few non-limiting examples) or manual exhaustive radio surveying of the buildings including all the floors, spaces and rooms. This is rather expensive and will take a considerable amount of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices (e.g. smartphones).

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)-measurements as two-dimensional radio maps and is hereby able to capture the dynamics of the indoor radio propagation environment in a compressable and highly accurate way. This makes it possible to achieve unprecedented horizontal positioning accuracy with the Wi-Fi signals only within the coverage of the created radio maps and also gives highly reliable floor detection. However, the radio maps need to be currently surveyed manually, which is blocking rapid global scalability.

Huge volumes of indoor Wi-Fi measurements data could be harvested via crowd-sourcing if the consumer devices were equipped with the necessary functionality to enable the Wi-Fi data collection as a background process, naturally with the end-user consent. It could also be possible to use volunteers to survey the sites (e.g. buildings) in exchange of reward or recognition and get the coverage climbing up globally in the places and venues important for the key customers. However, the technical challenges related to the harvesting, processing, redundancy, ambiguity and storing the crowd-source data need to be understood and solved first, before the Wi-Fi radio map creation can be based on the machine learning of the indoor Wi-Fi radio maps.

SUMMARY

Radio nodes should not change their location once they are installed to obtain and maintain best positioning performance in indoor positioning and/or floor detection systems. A displacement of a radio node increases error in the positioning performance. This is caused by a previously generated radio map, which does not match the location respectively position of the radio node in the venue.

It is thus, inter alia, an object of the invention to detect a displacement of one or more radio nodes in a venue in a quick and efficient way.

According to a first exemplary aspect of the present invention, a method is disclosed, the method, performed by at least one electronic device, comprising:

obtaining a piece of respective position information, wherein the piece of respective position information is indicative of a position of a respective radio node in a venue, wherein the piece of respective position information is stored in a memory prior to the obtaining;

determining the position of the respective radio node in the venue based at least partially on one or more respective radio measurements of one or more further respective radio nodes surrounding the respective radio node and on one or more further respective radio measurements gathered by the respective radio node, wherein one or more respective signals are sent by the one or more respective radio nodes surrounding the respective radio node, and wherein one or more pieces of respective identifier information associated with the one or more respective radio nodes surrounding the respective radio node are comprised by the one or more respective signals sent by the one or more respective radio nodes surrounding the respective radio node; and determining a piece of respective displacement information based on the obtained piece of respective position information and the determined position of the respective radio node, wherein the piece of respective displacement information is indicative of a displacement of the respective radio node in case the determined position of the respective radio node differs from the position of the respective radio node represented by the obtained piece of position information.

This method may for instance be performed and/or controlled by an apparatus, e.g. a central device, a radio node (e.g. a beacon), a server, or any device being capable of communicating (e.g. using a transceiver) with other devices in the venue, e.g. by using the same type of communication (e.g. same transceiver and/or means according to the same communication standard). The apparatus, the central device, the radio node, or the device may for instance be able to communicate with the respective radio node. For instance, the method may be performed and/or controlled by using at least one processor of the central device, the radio node, the server or the device being capable of communicating with other devices in the venue. For instance, a radio node (e.g. beacon) itself may for instance perform and/or control the method according to the first exemplary aspect of the present invention. For instance, a center device may for instance behave as a beacon for positioning, and may additionally update its own piece of position information in case of a displacement according to the determined piece of displacement information.

According to a further exemplary aspect of the invention, a computer program is disclosed, the computer program when executed by a processor causing an apparatus, for instance a central device or a server, to perform and/or control the actions of the method according to the first exemplary aspect of the present invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus may be a module or a component for a device, for example a chip. Alternatively, the disclosed apparatus according to any aspect of the invention may be a device, for instance a central device and/or a server. The disclosed apparatus according to any aspect of the invention may comprise only the disclosed components, for instance means, processor, memory, or may further comprise one or more additional components.

According to a third exemplary aspect of the invention, a system is disclosed, comprising:
  comprising at least one apparatus according to all aspects of the present invention, which is configured at least to perform and/or control the method according to the first exemplary aspect of the present invention, and one or more radio nodes configured to provide (e.g. transmit) one or more gathered (e.g. measured) respective radio measurements.

Further, the at least one apparatus and/or the one or more respective radio nodes may be configured to provide a radio map for performing indoor positioning and/or floor detection, e.g. to one or more electronic device.

The electronic device may for instance be a terminal (e.g. a smartphone, tablet, navigation device, to name but a few non-limiting examples). The electronic device may for instance be portable (e.g. weigh less than 5, 4, 3, 2, or 1 kg). The electronic device may for instance comprise or be connectable to a display for displaying a radio map, e.g. the generated radio map. The electronic device may for instance be configured to perform indoor navigation and/or positioning (e.g. estimating a position in a venue) and/or floor detection based on a provided radio map. The electronic device may for instance comprise or be connectable to means for outputting sound, e.g. in the form of spoken commands or information. The electronic device and/or the terminal may for instance comprise or be connectable to one or more sensors for determining the electronic devices position, such as radio-based indoor positioning from e.g. observed RSS-(received signal strength) measurements as e.g. a horizontal position and/or floor level (e.g. as vertical position) in a venue.

In the following, exemplary features and exemplary embodiments of all aspects of the present invention will be described in further detail.

The respective radio node and/or the one or more further respective radio nodes may for instance be comprised by the venue, e.g. by an infrastructure of the venue. The radio nodes of the venue may for instance be beacons used for indoor positioning and/or floor detection. The radio nodes may for instance be configured according to BT-(Bluetooth) and/or BLE-(Bluetooth Low Energy) specification, or may for instance be Wi-Fi Access Points for indoor positioning and/or floor detection, e.g. according to WLAN-(Wireless Local Area Network) specification. Indoor positioning and/or floor detection may for instance be performed based on a radio map. A respective radio node may for instance comprise or be connectable to a transceiver, e.g. according to BT-, BLE-, and/or WLAN-specification to provide wireless-based communication. A respective radio node may for instance use such a transceiver for determining (e.g. measuring) one or more radio measurements. Further, such a transceiver may for instance be used to transmit (e.g. broadcast) the determined one or more radio measurements.

The venue may for instance be a building, shopping mall, office complex, public accessible location (e.g. station, airport, university, or the like), to name but a few non-limiting examples.

A respective radio node of the venue may for instance transmit one or more signals comprising at least a piece of respective identifier information of said radio node. In case one or more transmitted signals of a respective radio node are received, the respective radio node may for instance be identified based at least partially on the piece of respective identifier information comprised by the transmitted one or more signals.

The position of the respective radio node in the venue is determined based at least partially on one or more respective radio measurements of one or more further respective radio nodes surrounding the respective radio node and on one or more further respective radio measurements gathered (e.g. measured) by the respective radio node. The one or more respective radio measurements may for instance be transmitted, e.g. to the at least one apparatus.

For determining the position of the respective radio node in the venue, a radio map may for instance be generated based at least partially on the one or more respective radio measurements and the one or more pieces of respective identifier information. For instance based on the one or more pieces of respective identifier information, one or more pieces of respective position information may for instance be determined, wherein the one or more pieces of respective position information may for instance be indicative of the position of the one or more respective radio nodes, from which the one or more pieces of respective identifier information stem (e.g. comprised by the one or more transmitted signals of a respective radio node).

It will be understood that a respective radio node in the venue may not determine (e.g. measure) its one or more own respective signals (e.g. signal strength of one or more signals transmitted by the respective radio node). Thus, for determining the position of the respective radio node, the one or more own respective signals of the respective radio node may for instance not be used. Even if the one or more own respective signals are available (e.g. measurable by the respective radio node), the one or more own respective signals (e.g. received signal strength value determined based on the one or more own respective signals being observable by the respective radio node) should not be used for determining the position respectively location of the respective radio node.

For determining the position of the respective radio node in the venue, the one or more further respective radio measurements gathered by the respective radio node may for instance be compared to the ones of the radio map. For instance, the position of the respective radio node in the venue may for instance be determined by calculating a likelihood value that the one or more further (received) respective radio measurements match those comprised by a generated radio map. Additionally, the position respectively location of the respective radio node in the venue may for instance be estimated by combining the determined likelihood value with weighted mean. Additionally or alternatively, the position respectively location of the respective radio node in the venue may for instance be estimated by using weighted mean of one or more further respective radio nodes surrounding the respective radio node and e.g. one or more received signal strength values determined by the respective radio node, wherein the one or more received signal strength values are observable at the position respectively location of the respective radio node. The received signal strength value may for instance be determined based on one or more signals of the one or more further respective radio nodes surrounding the respective radio node received by the respective radio node. More details with respect to weighted mean are given below and in the detailed description part of this specification.

For determining the piece of respective displacement information, the obtained piece of respective position information and the determined position of the respective radio node may for instance be compared to each other. In case the obtained piece of respective position information does not match the determined position of the respective radio node, the piece of respective displacement information is indicative of a displacement of the respective radio node in the venue. In case the obtained piece of respective position information does comply (e.g. match) the determined position of the respective radio node, the piece of respective displacement information is indicative of a correct position of the respective radio node in the venue. Whether the obtained piece of respective position information matches the determined position of the respective radio node or not, may for instance be determined based at least partially on a threshold value. The threshold value may for instance be set to a maximum allowable variance between the obtained piece of respective position information and the determined position of the respective radio node (e.g. in percent, or in a unit of distance). The threshold value may for instance be set to a distance, e.g. 3 m, 1 m or less, e.g. 0.9 m, 0.8 m, 0.7 m, 0.6 m, 0.5 m, 0.4 m, 0.3 m, 0.2 m, 0.1 m, or less. The distance may for instance be a function of variance of the determined (e.g. estimated) position respectively location of the respective radio node. For instance, the threshold value for a distance of a function of variance may for instance be set to 1 m for a radio communication between the entities (e.g. the respective radio node and the one or more further respective radio nodes surrounding the respective radio node in the venue) according to the UWB (Ultra Wide Band) specification, or may for instance be set to 3 m for a radio communication between the entities (e.g. the respective radio node and the one or more further respective radio nodes surrounding the respective radio node in the venue) according to the BLE (Bluetooth Low Energy) and/or Wi-Fi specification.

For determining the piece of respective displacement information, the respective radio node in the venue may for instance comprise a radio map, e.g. stored in a memory of the respective radio node, or in a memory that is accessible by the respective radio node in the venue. The piece of displacement information may for instance be determined by the respective radio node determining its position respectively location in the venue based at least partially on this radio map. The determining of the position may for instance be performed as already described above. The determined position of the respective radio node may for instance be compared to the obtained piece of respective position information for determining the piece of displacement information of the respective radio node. Additionally, in this aforementioned case, the respective radio node may for instance be a center device behaving both as a radio node (e.g. beacon) and a radio map generator. More details with respect to the generation of radio maps are given below in this specification.

Further, a respective radio node may for instance determine its position respectively location without a radio map as well. For instance, one or more further radio nodes surrounding the respective radio node may for instance send their positions respectively locations, e.g. as a piece of respective position information. The respective radio node may for instance determine one or more received signal strength values of said one or more further respective radio nodes. The respective radio node may for instance calculate weighted mean with the determined received signal strength value and the positions respectively locations of the one or more further respective radio nodes surrounding the respective radio node to determine its own position respectively location. Such a determined position of the respective radio node may for instance be compared to the obtained piece of respective position information for determining the piece of displacement information of the respective radio node.

If the determined piece of displacement information is indicative of a displacement of the respective radio node, further exemplary embodiments of the method according to all aspects of the present invention may for instance be performed and/or controlled, e.g. as described below.

According to an exemplary embodiment of all aspects of the present invention, one or more pieces of respective position information of the one or more respective radio nodes are determined based on the one or more pieces of respective identifier information, wherein the respective radio measurements and the piece of respective position information form a respective fingerprint.

The position of one or more respective radio nodes of the venue represented by one or more pieces of respective position information may for instance be stored in a memory. The memory may for instance be a database. The memory may for instance be comprised by or being accessible by the at least one apparatus. The memory may for instance be comprised by a server or a server cloud, wherein the memory may for instance be accessible by the at least one apparatus, e.g. via a communication network (e.g. the Internet). Additionally or alternatively, the memory may for instance be comprised by a respective radio node in the venue. The position of the one or more respective radio nodes in the venue represented by the one or more pieces of respective position information may for instance determined (e.g. measured), e.g. directly after the installation of the one or more respective radio nodes in the venue.

The position of the one or more respective radio nodes in the venue may for instance be measured manually, e.g. by a person. In this way, after the installation of the one or more respective radio nodes, valid one or more positions represented by the one or more pieces of respective position information of the one or more respective radio nodes in the venue are stored in the memory. Additionally or alternatively, the position of the one or more respective radio nodes in the venue may for instance be determined (e.g. calculated) from one or more known reference radio nodes, which may for instance share (e.g. broadcast) their positions respectively locations, e.g. as a piece of respective position information. Based on the broadcasted piece of respective position information, the respective radio node of the one or more respective radio nodes in the venue may for instance determined its position respectively location by itself. Additionally or alternatively, a center device may for instance determine (e.g. calculate) the position of the one or more respective radio nodes in the venue. For instance, the center device may for instance determine the position respectively location of the one or more respective radio nodes based at least partially on one or more known reference positions respectively locations and on one or more respective radio measurements received from one or more further respective radio nodes surrounding the one or more respective radio nodes. In the following of this specification, this respective position of a respective radio node in the venue is also referred to as 'stored-location'.

The piece of respective position information is indicative of the respective location of the respective radio node in the venue, wherein that respective location should be checked for displacement according to the method of the first exemplary aspect of the present invention.

The piece of respective position information may for instance be indicative of a horizontal position and additionally of a floor (e.g. a vertical position) of the venue. The piece of respective position information may for instance comprise at least a pair of latitude/longitude coordinates, and additionally an altitude, or x-, y-coordinates, and additionally a floor level of the venue (e.g. an altitude, or a z-coordinate).

The piece of respective position information is determined based on a piece of respective identifier information of the respective radio node. The piece of respective identifier information may for instance be associated with a respective radio node, wherein the respective radio node is uniquely identifiable based at least partially on the piece of respective identifier information. The position of a respective radio node may for instance be represented by a piece of respective position information. The piece of respective position information may for instance be associated with a piece of respective identifier information. For instance, one or more pieces of respective identifier information associated with one or more pieces of respective position information may for instance be stored in a memory, e.g. the memory (e.g. a database). Based on a piece of respective identifier information, the piece of respective position information may for instance be determined, e.g. by a look-up, e.g. in a table of a database, to determine the piece of respective position information in the stored memory.

According to an exemplary embodiment of all aspects of the present invention, the position of the respective radio node is determined based on a weighted mean calculation using one or more normalized weights being dependent on one or more respective received signal strengths value of the one or more respective signals received by the respective radio node and the determined one or more pieces of respective position information of the one or more respective radio nodes.

For determining one or more normalized weights, e.g. high RSS values may for instance be associated with more weight than lower RSS values.

The position of the respective radio node may for instance be determined (e.g. estimated) according to the following equation 1:

$$\underline{\mu}=E(\underline{x})=\Sigma_{i=1}^{N} w_i \underline{x}_i,$$

wherein $\mu$ is the estimated location; $\underline{x}$ is the fingerprint location respectively position, e.g. represented by the one or more pieces of respective position information, w is normalized weight, which is dependent on at least one RSS value, as mentioned above.

According to an exemplary embodiment of all aspects of the present invention, the one or more normalized weights are determined based at least partially on one or more respective likelihood values, wherein a respective likelihood value of the one or more respective likelihood values are being indicative of one or more respective received signal strengths values of the one or more respective signals received by the respective radio node being concentrated at the position of the respective radio node.

The position of the respective radio node may for instance be determined (e.g. calculated) using the above mentioned equation 1 and the one or more weights may for instance be taken from one or more respective likelihood values. The one or more respective likelihood values at a position in the venue may be determined according to the following equation 2:

$$\text{Normal likelihood} = \frac{\exp\left(-\frac{(RSS_{radio} - RSS_{meas})^2}{2\delta^2}\right)}{\sqrt{2\pi\delta^2}},$$

where $RSS_{radio}$ is RSS value received at a location respectively position in radio map and $RSS_{meas}$ is a measured RSS value at a respective radio node, e.g. the respective radio node. Likelihood is calculated for all locations respectively positions of the radio map.

According to an exemplary embodiment of all aspects of the present invention, the method further comprises:
updating the stored piece of respective position information with the determined position of the respective radio node in case the determined piece of respective displacement information is indicative of that the obtained piece of respective position information is not valid.

The piece of respective displacement information may for instance be determined by differentiating between the following cases i) to iii):
i) the respective radio node in the venue has a valid stored-location;
ii) the respective radio node in the venue has not a valid (e.g. wrong respectively incorrect) stored-location; and
iii) the respective radio node in the venue is physically displaced.

In case i), the determined displacement information is indicative of a correct position of the respective radio node in the venue. There is no need to update the piece of respective position information stored in the memory. The piece of respective position information in the memory is correct respectively up-to-date.

If the determined displacement information is indicative of a displacement of the respective radio node in the venue, the case ii) or the case iii) may for instance be given. Either the respective radio node in the venue is physically displaced, in which case the piece of respective position information stored in the memory was once correct, but due to the displacement of the respective radio node is now incorrect. This case corresponds to the case iii). Or the piece of respective position information of the respective radio node stored in the memory was not valid. This case corresponds to the case ii). In both cases ii) and iii), the piece of respective position information stored in the memory needs to be updated or to be replaced with a piece of respective position information being indicative of the correct position of the respective radio node in the venue.

In this way, degradation in positioning performance (e.g. indoor positioning and/or floor detection) due to a displacement of one or more radio nodes in a venue, wherein the indoor positioning and/or floor detection is based at least partially on one or more radio maps, can be prevented. One or more displaced radio nodes in a venue can be detected. Corrective actions for re-establishing the positioning performance can be taken, e.g. generating a 'new' radio map based at least partially on the correct position of the respective radio node in the venue.

According to an exemplary embodiment of all aspects of the present invention, the method further comprises:

determining one or more pieces of respective position information of the one or more respective radio nodes, wherein the one or more pieces of respective position information of the one or more respective radio nodes are determined based on the one or more pieces of respective identifier information, wherein the respective radio measurements and the piece of respective position information form a respective fingerprint; and
generating a radio map based at least partially on the one or more respective fingerprints of the one or more further respective radio nodes surrounding the respective radio node; and
wherein the position of the respective radio node is determined based at least partially on the generated radio map.

The radio map may for instance represent a map of the venue, or at least a part (e.g. region or area) of the map of the venue. These parts of the map of the venue may for instance be parts of a larger radio map. These parts may for instance pertain to different venues, or one or more different floors of a venue. The map of the venue may have been divided, e.g. by a regular grid (the parts of the venue may then for instance be (e.g. quadratic) tiles). The radio map as used herein refers to a map (e.g. of the venue) e.g. comprising fingerprints and/or radio measurements (e.g. a plurality of fingerprints and/or radio measurements) associated with horizontal positions and/or vertical positions located within the venue. Based on a comparison of the fingerprints and/or radio measurements of the radio map and a radio measurement (e.g. determined and/or measured, e.g. by an electronic device), indoor positioning and/or floor detection (e.g. horizontal and/or vertical position estimation) may for instance be performed.

The radio map may for instance be generated by associating a respective radio measurement with a corresponding location (e.g. horizontal and/or vertical position, e.g. in a venue) of a map (e.g. of the venue) represented by a piece of respective position information. The respective radio measurement and the piece of respective position information may for instance be comprised by a respective fingerprint. Additionally or alternatively, such a respective fingerprint may for instance be comprised by the generated radio map. The generated radio map may for instance be stored in a memory, e.g. the memory. The memory may for instance be comprised or be connectable to the at least one apparatus performing and/or controlling the method according to the first exemplary aspect of the present invention. In the latter case, the memory may for instance be accessible by the at least one apparatus, in which case the memory may not be comprised by the at least one apparatus.

In case the piece of respective displacement information is indicative of a displacement of the respective radio node, the method according to the first exemplary aspect may for instance determine a validity of a radio map associated with the respective radio node. The validity may for instance be indicative of a radio map associated with the respective radio node not being valid in case the piece of respective displacement information is indicative of a displacement of the respective radio node.

The radio map may for instance be outputted (and optionally stored in a memory) in one of the cases ii) and iii), which may for instance be considered when determining the piece of respective displacement information. Whether the respective radio node in the venue has not a valid (e.g. wrong) stored-location, or the respective radio node in the venue is physically displaced, in order to re-establish the positioning performance of e.g. indoor positioning and/or floor detection systems, a (new) radio map may be the basis for performing indoor positioning and/or floor detection and a radio map generated earlier may for instance be replaced by the (new) radio map.

The generated (e.g. and optionally stored) radio map may for instance be available to one or more electronic devices, e.g. by being provided (e.g. outputted) to the one or more electronic devices, or by being accessible by the one or more electronic devices, e.g. via a wireless or wire-bound connection e.g. to an apparatus that stores the generated radio map (e.g. a server or a server cloud). This apparatus may for instance be remote from the one or more electronic devices or may be included with the at least one apparatus performing and/or controlling the method according to the first exemplary aspect of the present invention into one device.

The outputted radio map may for instance be used for performing indoor positioning and/or floor detection, e.g. by another electronic device or by a plurality of electronic device.

According to an exemplary embodiment of all aspects of the present invention, the method further comprises:

outputting the generated radio map.

The generated radio map may for instance be outputted. The radio map may for instance be outputted by being provided or caused providing (e.g. to a server, or to another apparatus (e.g. an IoT (Internet of Things) device, which may not be capable of generating the radio map on its own, or to another apparatus that transfers the generated radio map to the server. For instance, a central device or a server may generate the radio map and share (e.g. transmit respectively transfer) the generated radio map to an IoT device. The IoT device may for instance use the provided radio map to determine its position (e.g. horizontal and/or vertical position).

According to an exemplary embodiment of all aspects of the present invention, the respective radio node is capable of broadcasting one or more respective fingerprints collected by itself.

The respective radio node may for instance determine (e.g. gather, or measure) one or more respective radio measurements of one or more further respective radio nodes surrounding the respective radio node, wherein one or more respective signals are sent by the one or more respective radio nodes surrounding the respective radio node, and wherein one or more pieces of respective identifier information associated with one or more respective radio nodes surrounding the respective radio node may for instance be comprised by the one or more respective signals sent by the one or more respective radio nodes surrounding the respective radio node.

As described above, based on the one or more pieces of respective identifier information, one or more pieces of respective position information may for instance be determined, wherein the one or more pieces of respective position information are indicative of the respective position of the one or more respective radio nodes surrounding the respective radio node.

The one or more respective radio measurements of the one or more respective radio nodes surrounding the respective radio node may for instance form one or more respective fingerprints together with the one or more pieces of respective position information of said one or more respective radio nodes surrounding the respective radio node.

The respective radio node may for instance be capable of broadcasting the one or more respective fingerprints.

Further, the respective radio node may for instance be capable of broadcasting one or more respective fingerprints, which are received by the respective radio node from one or more respective radio nodes surrounding the respective radio node. For instance, the respective radio node may receive one or more respective fingerprints, which may for instance be broadcasted by one or more respective radio nodes surrounding the respective radio node. These received one or more respective fingerprints may for instance be relayed by the respective radio node, e.g. by broadcasting these received one or more respective radio nodes by the respective radio node as well.

According to an exemplary embodiment of all aspects of the present invention, the memory storing the one or more pieces of respective position information of the one or more respective radio nodes of the venue is accessible by the one or more respective radio nodes.

The memory may for instance be a database. The memory may for instance be comprised by or being accessible by the at least one apparatus. The memory may for instance be comprised by a server (e.g. a part of the server) or a server cloud, wherein the memory may for instance be accessible by the at least one apparatus, e.g. via a communication network (e.g. the Internet). Additionally or alternatively, the memory may for instance be comprised by a respective radio node in the venue. The memory may for instance store the one or more pieces of respective position information, one or more radio maps (e.g. the generated radio map), a combination thereof, or the like to name but a few non-limiting examples.

According to an exemplary embodiment of all aspects of the present invention, the one or more respective radio measurements of the one or more further respective radio nodes surrounding the respective radio node and the one or more pieces of respective position information of the one or more further respective radio nodes form one or more respective fingerprints.

Based at least partially on the one or more respective fingerprints and the one or more radio measurements, e.g. gathered (e.g. measured) by the respective radio node, the position of the respective radio node may for be determined. The one or more respective fingerprints may for instance be obtained (e.g. collected, e.g. by receiving the one or more respective fingerprints, e.g. by the at least one apparatus). The one or more respective fingerprints may for instance be used for determining the position of the respective radio node additionally or alternatively to determining the position of the respective radio node based at least partially on the one or more respective radio measurements of the one or more further respective radio nodes surrounding the respective radio node and the one or more respective radio measurement gathered by the respective radio node. For determining the position of the respective radio node, a radio map may for instance be used. The radio map may for instance be generated prior to determining the position of the respective radio node. Such a radio map may for instance be generated based at least partially on such one or more respective fingerprints. Such one or more respective fingerprints may for instance comprise one or more radio measurement (e.g. received signal strengths values) and one or more pieces of respective position information of one or more respective radio nodes, wherein the one or more respective radio measurements are gathered (e.g. measured) based on one or more signals sent by said one or more respective radio nodes.

According to an exemplary embodiment of all aspects of the present invention, at least one respective received signal strengths value of the one or more respective signals received by the respective radio node is determined based at least partially on the one or more respective radio measurements gathered by the respective radio node.

Additionally or alternatively, the obtained one or more respective fingerprints may for instance comprise at least one respective received signal strengths value observable at the position of the respective radio node based on the one or more respective signals received by the respective radio node.

The at least one RSS (received signal strength) value may for instance be observable at the location of the respective radio node, which e.g. performs the one or more respective radio measurements. The at least one RSS value may for instance be obtained from one or more respective signals of one or more respective radio nodes surrounding the respective radio node, or in whose one or more respective coverage areas the respective radio node is located respectively positioned. Due to the position of the respective radio node in one or more respective coverage areas of one or more respective radio nodes surrounding the respective radio node, one or more respective signals sent by the one or more respective radio nodes surrounding the respective radio node are observable (e.g. receivable).

According to an exemplary embodiment of all aspects of the present invention, the position of the respective radio node in the venue is determined based at least partially on a generated radio map and on the one or more respective radio measurements, wherein the radio map is generated based at least partially on the one or more respective fingerprints.

One or more respective fingerprints comprise one or more pieces of respective position information (alternatively these are determined as described above), so that one or more radio measurements may for instance be associated with the position in the venue. Additionally, the generated radio map may for instance be interpolated. Radio measurements (e.g. RSS values) for one or more parts and/or areas of the radio map comprising one or more positions in the venue with no radio measurement(s) associated with them may for instance be determined (e.g. calculated) by the interpolation.

Based on the one or more respective radio measurements of the respective radio node and the generated radio map, the position of the respective radio node may for instance be determined.

The one or more respective fingerprints based on which at least partially the radio map is generated, may for instance be obtained (e.g. received) directly, or the one or more respective fingerprints may for instance be formed prior to the generating of the radio map, e.g. based at least partially on one or more radio measurements and one or more pieces of respective position information, and/or based at least partially on at least one RSS value and one or more pieces of respective position information.

According to an exemplary embodiment of all aspects of the present invention, the generated radio map is stored in the memory.

The storing of the generated radio map may for instance update respectively replace another radio map, generated prior to the performing and/or controlling of the method according to the first exemplary aspect of the present invention.

According to an exemplary embodiment of all aspects of the present invention, the at least one apparatus is a radio node.

Thus, said radio node may for instance obtain a piece of respective position information of a respective radio node that is different from said radio node. Further, the position of said respective radio node may for instance be determined. Further, a piece of respective displacement information may for instance be determined by the radio node, wherein the piece of respective displacement information is indicative of a displacement of said respective radio node.

According to an exemplary embodiment of all aspects of the present invention, the at least one apparatus is a central device or a server.

In particular as an alternative to the at least one apparatus being a radio node, the at least one apparatus may be a central device or a server. The central device or the server may for instance be capable of collecting (e.g. receiving) one or more respective fingerprints and one or more radio measurements of a respective radio node, the position of the respective radio node may for instance be determined based at least partially on the one or more respective fingerprints and the one or more radio measurements of the respective radio node.

It will be understood that in one indoor positioning and/or floor detection system, more than one at least one apparatus performing and/or controlling the method according to the first exemplary aspect of the present invention may be used.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
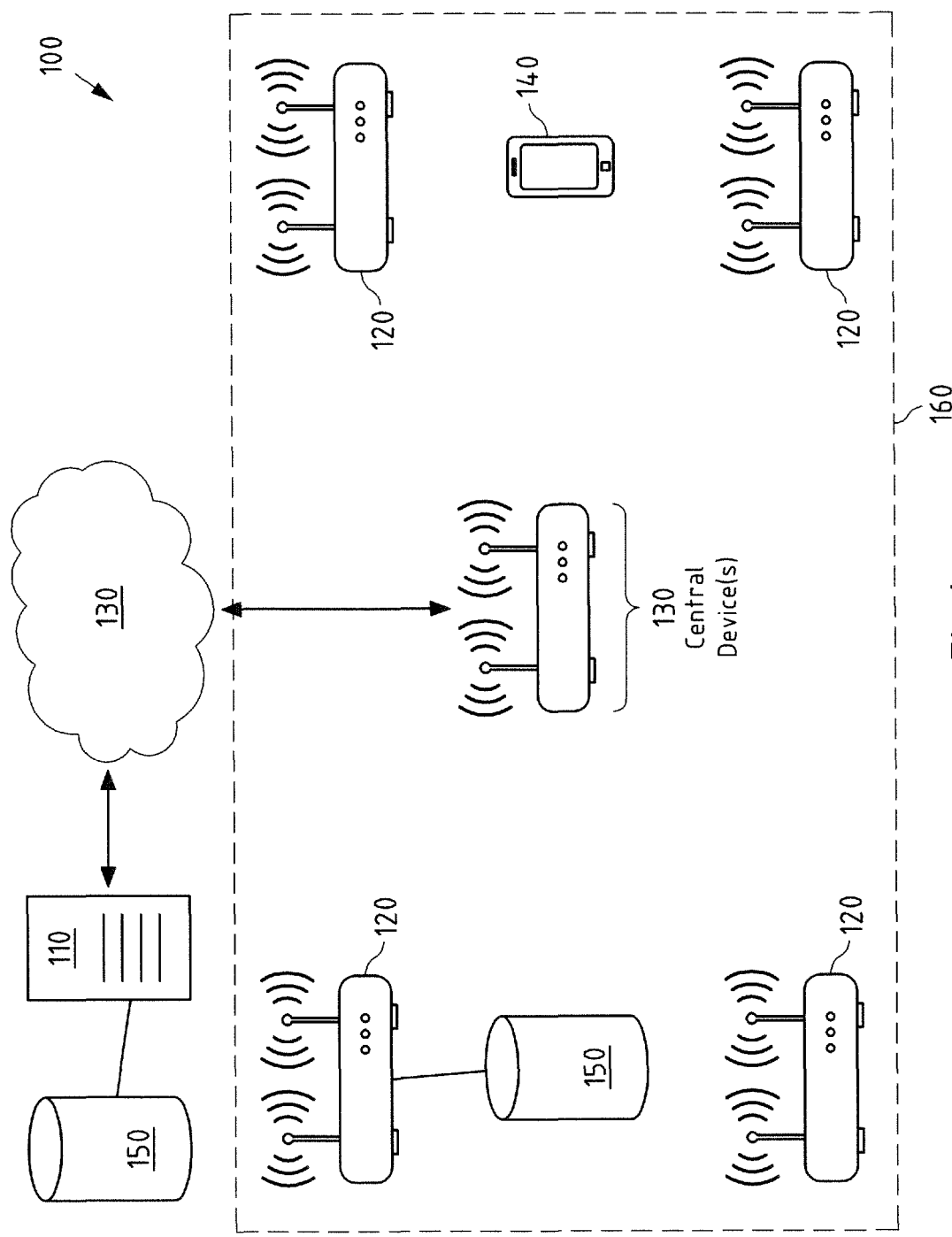
FIG. 1 a schematic block diagram of an example embodiment of a system according to the third exemplary aspect of the present invention.

FIG. 1 shows a schematic block diagram of an example embodiment of a system according to the third exemplary aspect of the present invention.

The system 100 comprises a server 110, e.g. configured to perform and/or control an example method according to the first exemplary aspect of the present invention. The system 100 comprises a central device 130 or alternatively more than one central devices, e.g. configured to perform and/or control an example method according to the first exemplary aspect of the present invention. The central device 130 may for instance be a (specific/chosen) radio node of the venue. The central device 130 may for instance comprise means for communicating with at least one radio node (e.g. radio nodes 120 of FIG. 1) and/or with an electronic device (e.g. electronic device 140 of FIG. 1). Further, central device may for instance be configured to communicate with a server, e.g. the server 110 of FIG. 1, e.g. via a communication network (e.g. communication network 130 of FIG. 1). Further, the system 100 comprises a communication network 130, e.g. the Internet or another wireless-based communication network, such as a Wireless Local Area Network (WLAN), UWB, or a Bluetooth based communication network.

The system 100 comprises a plurality of radio nodes 120. The radio nodes 120 are comprised by a venue 160. Each respective radio node 120 of the plurality of radio nodes 120 may for instance comprise means for communicating with at least one radio node (e.g. radio nodes 120 of FIG. 1) and/or with an electronic device (e.g. electronic device 140 of FIG. 1). For instance, all devices shown inside of the stroked box representing the venue 160 in FIG. 1 can communicate with each other, e.g. based on wireless based communication. The wireless based communication may for instance be according to e.g. a WLAN, a UWB, or a Bluetooth (in particular BLE) standard communication, to name but a few non-limiting examples.

The system 100 comprises a database 150, which is connectable to the radio nodes 120. Additionally or alternatively, the database 150 may for instance be comprised or be connectable to server 110. Such a database 150 may for instance be comprised by each of the radio nodes 120, or a central database may be used, which is accessible (e.g. via the communication network 130) by each of the radio nodes 120. This database may for instance be the database 150, which is connected to server 110 in system 100.

Communication between the central device 130, and at least one of the radio nodes 120 may for instance take place at least partially in a wireless fashion, e.g. based on cellular communication or on WLAN- and/or BLE-based communication and/or cellular connection, to name but a few non-limiting examples. Further, communication between central device 130 and/or radio nodes 120 and one or more electronic devices 130 may take place at least partially in a wireless fashion, e.g. based on cellular communication or on WLAN- and/or BLE-based communication and/or cellular connection, to name but a few non-limiting examples. For instance, communication network 130 may for instance provide such a communication. Mobility of the electronic device 110 can be guaranteed by employing wireless-based communication.

The electronic device 110 may for instance comprise one or more means (e.g. a sensor, a transceiver, a receiver, a sender, or a combination thereof, e.g. a sender and a receiver) for a communication with at least one of the radio nodes 120. The central device 130 may for instance comprise one or more means (e.g. a sensor, a transceiver, a receiver, a sender, or a combination thereof, e.g. a sender and a receiver) for a communication with at least one of the radio nodes 120. Correspondingly, the at least one radio node of the radio nodes 120 comprises one or more corresponding means.

The database 150 may for instance be or comprise a memory. The memory may for instance store one or more pieces of respective position information. These one or more pieces of respective position information may for instance be associated with one or more pieces of respective identifier information uniquely identifying one or more respective radio nodes, e.g. the radio nodes 120.

Figure 2:
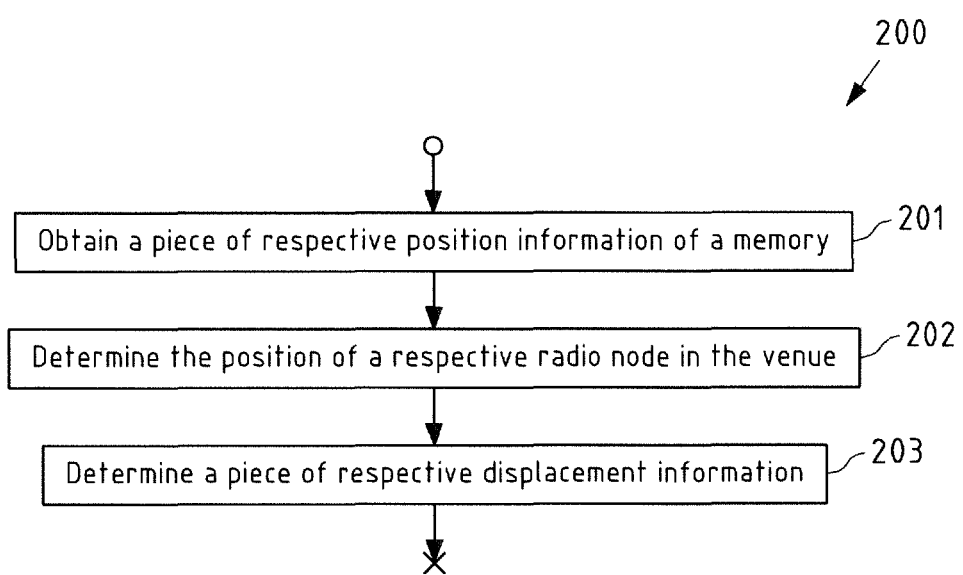
FIG. 2 a flow chart illustrating an example operation, e.g. in the at least one apparatus, e.g. according to FIG. 4, of an example method according to the first exemplary aspect of the present invention.
Figure 4:
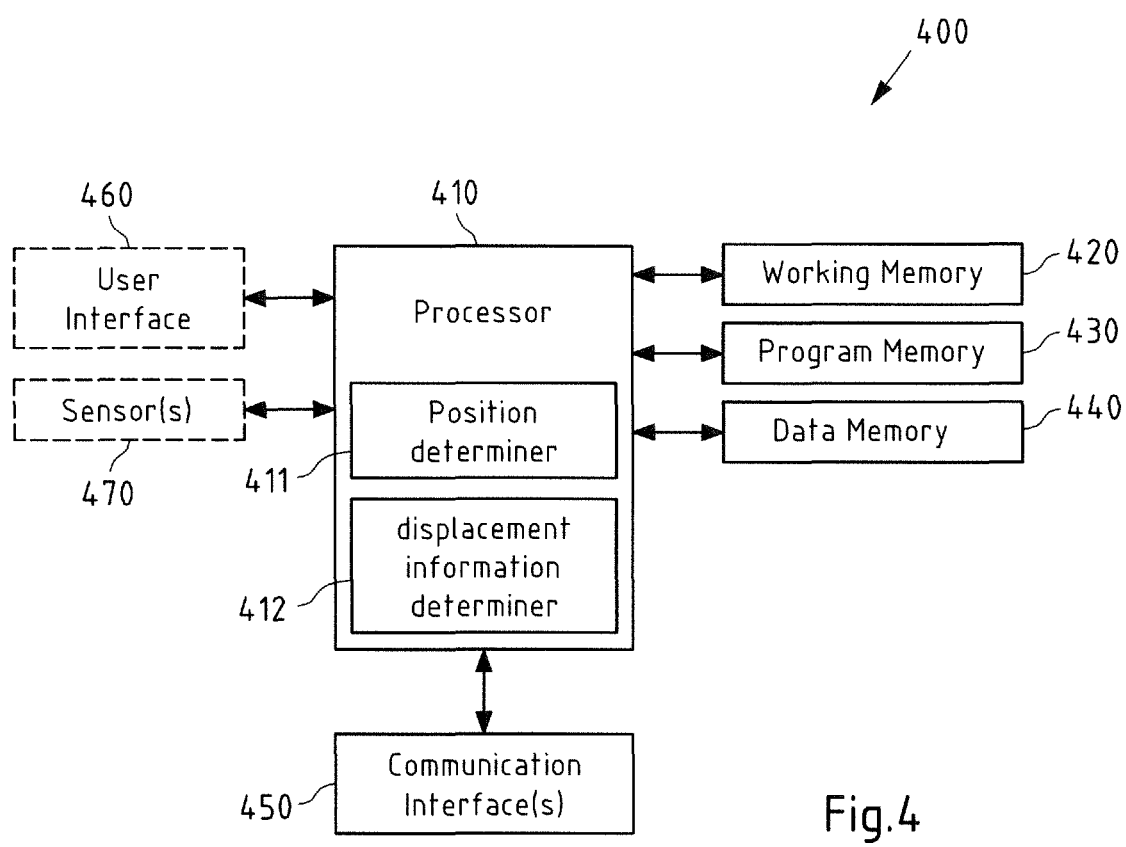
FIG. 4 a schematic block diagram of an example embodiment of an apparatus according to the present invention.

FIG. 2 shows a flow chart illustrating an example operation, e.g. in the at least one apparatus, e.g. according to FIG. 4, of an example method according to the present invention.

The flow chart 200 may for instance be performed by a central device, e.g. central device 120 of FIG. 1, and/or by a server, e.g. server 110 of FIG. 1.

In step 201, a piece of respective position information is obtained of a memory (e.g. database 150 of FIG. 1).

In step 202, the position of a respective radio node (e.g. one of the radio nodes 120 of FIG. 1) in the venue (e.g. venue 160 of FIG. 1) is determined.

In step 203, a piece of respective displacement information is determined. The displacement information is indicative of a displacement of the respective radio node, e.g. whether or not the respective radio node has been moved in the venue.

Figure 3:
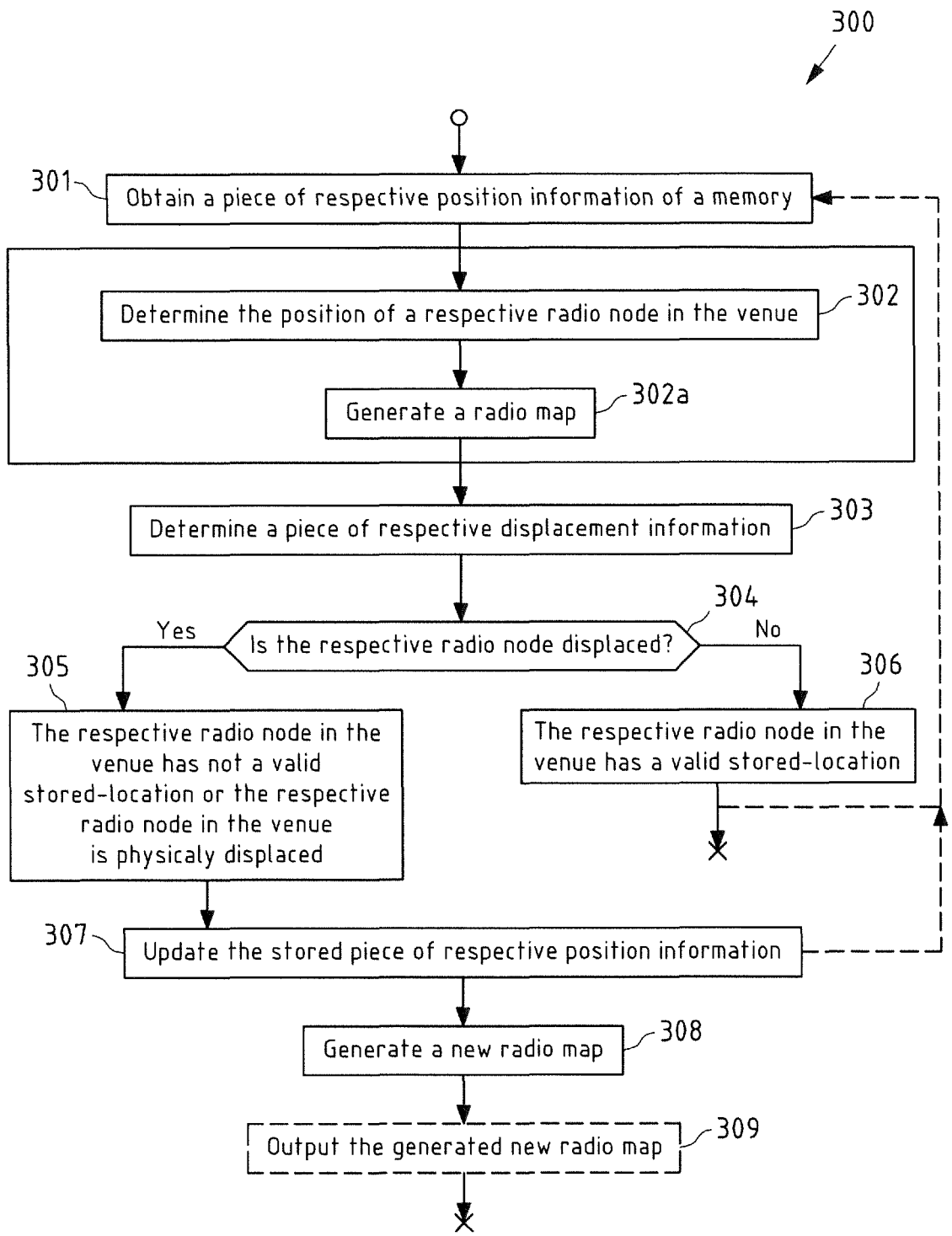
FIG. 3 a flow chart illustrating an example operation, e.g. in the at least one apparatus, e.g. according to FIG. 4, of example method according to the first exemplary aspect of the present invention.

FIG. 3 is a flow chart illustrating an example operation, e.g. in the at least one apparatus, e.g. according to FIG. 4, of a further example method according to the present invention.

The flow chart 300 may for instance be performed by a central device, e.g. central device 120 of FIG. 1, and/or by a server, e.g. server 110 of FIG. 1.

In step 301, a piece of respective position information is obtained of a memory (e.g. database 150 of FIG. 1).

In step 302, the position of a respective radio node (e.g. one of the radio nodes 120 of FIG. 1) in the venue (e.g. venue 160 of FIG. 1) is determined. The position of the respective radio node is determined based at least partially on one or more respective radio measurements of one or more further radio nodes surrounding the respective radio node (e.g. the further radio nodes 120 of FIG. 1) and on one or more radio measurements gathered (e.g. measured) by the respective radio node.

The one or more radio measurements may for instance be at least one RSS value, which is observable at the position respectively location of the respective radio node in the venue. A radio map is generated in step 302a based on the one or more respective radio measurements and one or more pieces of respective position information. The one or more pieces of respective position information may for instance be determined by a look-up in a database (e.g. database 150 of FIG. 1), wherein the one or more pieces of respective position information can be determined based on one or more pieces of respective identifier information, e.g. comprised by the one or more respective radio measurements and which are associated with the one or more pieces of respective position information comprised by a memory, e.g. the memory comprising the database 150. The generated radio map, which is generated based at least partially on the one or more respective radio measurements, e.g. represents a real-time generated radio map. Such a radio map may for instance represent an actual radio map, e.g. the most actual possible radio map, since the radio map is generated based on obtained (e.g. received) one or more radio measurements of the one or more respective radio nodes in the venue. The position of the respective radio node in the venue may for instance be determined (e.g. estimated) based on the generated radio map.

In step 303, a piece of respective displacement information is determined. For instance, the piece of respective displacement information may be determined based on a comparison of the position being represented by the obtained piece of respective position information of the respective radio in the venue (see step 301) with the determined position of the respective radio node (see step 303). In order to determine if the obtained piece of respective position information of the respective radio in the venue relatively matches the determined position of the respective radio node, e.g. a threshold value may for instance be used. The threshold value may for instance define an allowed deviation (e.g. in percent, or in a unit of distance) of how much the obtained piece of respective position information of the respective radio in the venue may be different from the determined position of the respective radio node in the venue.

In step 304, it is checked whether or not the respective radio node is displaced. The determined piece of respective displacement information may for instance be indicative of whether or not the respective radio node is displaced.

In case the respective radio node is not displaced, step 306 indicates that the respective radio node in the venue has a valid stored-location. The piece of respective position information, which was obtained in step 301, represents the correct position of the respective radio node in the venue. The flow chart 300 may end, or it may be repeated with another respective radio node in the venue in order to check whether or not that other respective radio node is displaced.

In case the respective radio node is displaced, step 305 indicates that the respective radio node in the venue either has not a valid stored-location, or the respective radio node in the venue is physically displaced. In both circumstances, the stored piece of respective position information, which was obtained in step 301, is updated (e.g. replaced) with a new piece of respective position information representing the position of the respective radio node that was determined in step 302. The flow chart 300 may end, or it may be repeated with another respective radio node in the venue in order to check whether or not that other respective radio node is displaced.

In step 308, a new radio map is generated. The new radio map is generated based at least partially on one or more respective radio measurements and at least the piece of respective position information representing the position of the respective radio node that was determined in step 302. The one or more respective radio measurements may for instance be determined based on one or more signals received from one or more radio nodes surrounding the respective radio node.

In optional step 309, the generated new radio map is outputted, e.g. provided to one or more radio nodes of the venue (e.g. radio nodes 120 of FIG. 1), or to a server (e.g. server 110 of FIG. 1), which may for instance store the outputted radio map in a memory (e.g. the memory of database 150 of FIG. 1). The outputted radio map may for instance be used to provide indoor positioning and/or floor detection services to one or more electronic devices (e.g. electronic device 140 of FIG. 1) so that the one or more electronic devices may for instance estimate their location in the venue.

FIG. 4 is a schematic block diagram of an apparatus 400 according to an exemplary aspect of the present invention, which may for instance represent the electronic device 110 of FIG. 1. Alternatively, the schematic block diagram of the apparatus 400 according to an exemplary aspect of the present invention may for instance represent at least one of the radio nodes 120 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to exemplary aspects of the invention.

Processor 410 may for instance comprise a position determiner 411 as a functional and/or structural unit. Position determiner 411 may for instance be configured to generate a radio map (see step 202 of FIG. 2; see step 302 of FIG. 3). Processor 410 may for instance comprise a position determiner 412 as a functional and/or structural unit. Position determiner 412 may for instance be configured to perform a position estimation (see step 203 of FIG. 2; see step 303 of FIG. 3). Processor 410 may for instance further control the memories 420 to 440, the communication interface(s) 450, the optional user interface 460 and the optional sensor(s) 470. In case the apparatus 400 (e.g. a central device, e.g. electronic device 110 of FIG. 1; or e.g. a server, e.g. server 110 of FIG. 1) is configured to perform and/or control the method according to the first aspect of the present invention, processor 410 may comprise the radio map generator 411 and the position estimator 412

Processor 410 may for instance execute computer program code stored in program memory 430, which may for instance represent a computer readable storage medium comprising program code that, when executed by processor 410, causes the processor 410 to perform the method according to the first exemplary aspect be performed and/or controlled by an apparatus, for instance a central device or a server.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store a generated radio map and/or a gathered fingerprint.

Communication interface(s) 450 enable apparatus 400 to communicate with other entities. In case the apparatus 400 is configured to perform and/or control the method according to the first exemplary aspect of the present invention, communication interface(s) 450 enables apparatus 400 to communicate e.g. with at least one of the radio nodes 120 of FIG. 1. In case the apparatus 400 is configured to perform and/or control the method to be performed and/or controlled by e.g. a radio node, communication interface(s) 450 enables apparatus 400 to communicate e.g. with the electronic device 110 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with other entities, for instance with server 110 of FIG. 1.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information.

Some or all of the components of the apparatus 400 may for instance be connected via a bus. Some or all of the components of the apparatus 400 may for instance be combined into one or more modules.

In the FIGS. 5a to 9d, one or more legends are shown representing received signal strength values observable at the position of the map accompanying the legend. The legend is divided into four different values for the received signal strength values. This limitation is due to illustrative reasons. It will be understood that the received signal strength values at a position in the venue can be any value and is not limited to only four different values. That the received signal values can be more than the four different received signal strength values visualized in the FIGS. 5a to 9d, is indicated in the respective legend by two different values being associated to one kind of hatching of the value. For instance, the legend of FIG. 5a has the received signal strength values of −120 and −110 associated with the vertical hatching, the received signal strength values of −100 and −90 associated with the horizontal hatching, the received signal strength values of −80 and −70 associated with the diagonal hatching extending from bottom left to top right, and the received signal strength values of −60 and −50 associated with the diagonal hatching extending from top left to bottom right (from the bottom to the top of the legend).

Figure 5A:
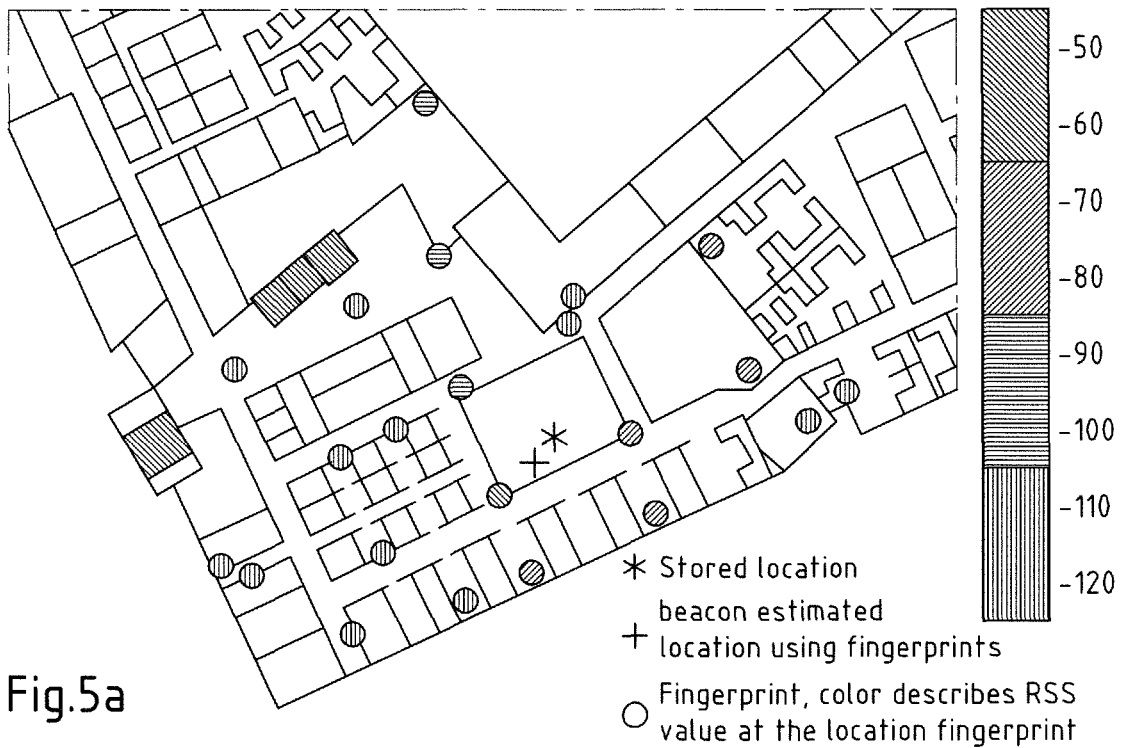
FIG. 5a a map of a venue visualizing a determined position of a respective radio node and an obtained position of the respective radio node according to a stored-location, as used in an example method according to the first exemplary aspect of the present invention.

FIG. 5a shows a map of a venue visualizing a determined position of a respective radio node and an obtained position of the respective radio node according to a stored-location, as used in an example method according to the first exemplary aspect of the present invention.

The determined position of the respective radio node and the obtained position of the respective radio node—stored location—comply with each other. The different hatchings used describe a RSS value at the location of the fingerprint represented by the dots.

Figure 5B:
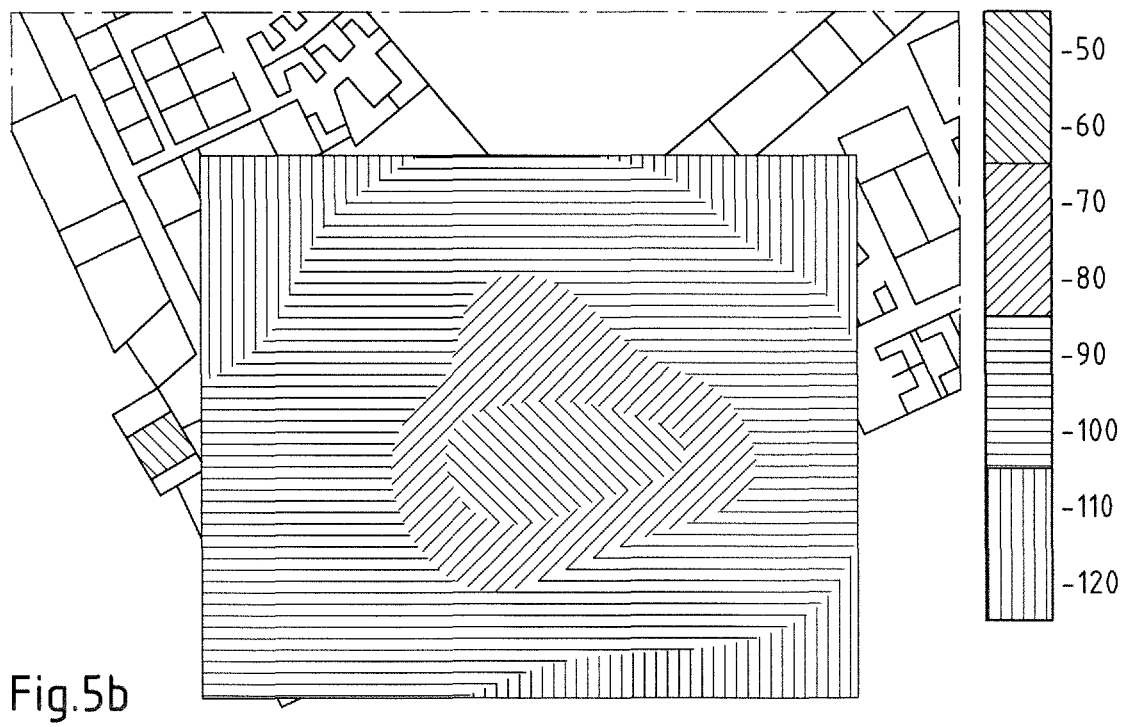
FIG. 5b a radio map of the venue shown in FIG. 5a, as generated by an example method according to the first exemplary aspect of the present invention.

FIG. 5b shows a radio map of the venue shown in FIG. 5a, as generated by an example method according to the first exemplary aspect of the present invention.

High RSS values compared to lower RSS values, shown in FIG. 5b by the different hatchings used, are concentrated in one area, wherein in said area the respective radio node is positioned. High RSS values are close to the respective radio node (e.g. beacon).

Figure 6A:
FIG. 6a a result of a likelihood determining of one or more respective received signal strengths values of the one or more respective signals received by the respective radio node, as used in an example method according to the first exemplary aspect of the present invention.

FIG. 6a shows a result of a likelihood determining of one or more respective received signal strengths values of the one or more respective signals received by the respective radio node, as used in an example method according to the first exemplary aspect of the present invention.

High likelihood values, e.g. as determined according to the equation 2 of this specification, are only concentrated close to a respective radio node (e.g. beacon). At hand, the likelihood of RSS value equals −60 dBm as shown radio map of FIG. 6a.

Figure 6B:
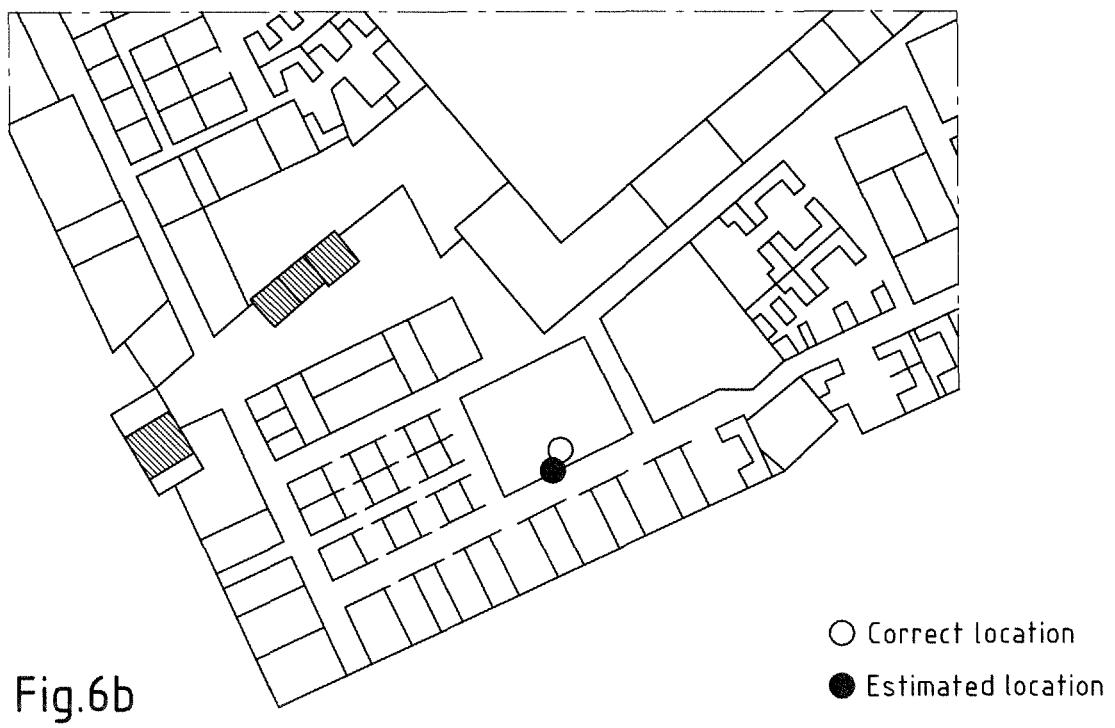
FIG. 6b a map of a venue visualizing a determined position of a respective radio node and an obtained position of the respective radio node according to a stored-location, as used in an example method according to the first exemplary aspect of the present invention.

FIG. 6b shows a map of a venue visualizing a determined position of a respective radio node and an obtained position of the respective radio node according to a stored-location, as used in an example method according to the first exemplary aspect of the present invention.

In FIG. 6b, the shown two dots nearly overlap each other. Thus, the determined position of the respective radio node and the obtained position of the respective radio node nearly match and the determined position of the respective radio node is close to the correct location respectively position of the respective radio node.

In FIGS. 7a to 9b, examples of displaced radio nodes are shown. Thus, a determined position of a respective radio node does not match the stored-location of the respective radio node.

Figure 7A:
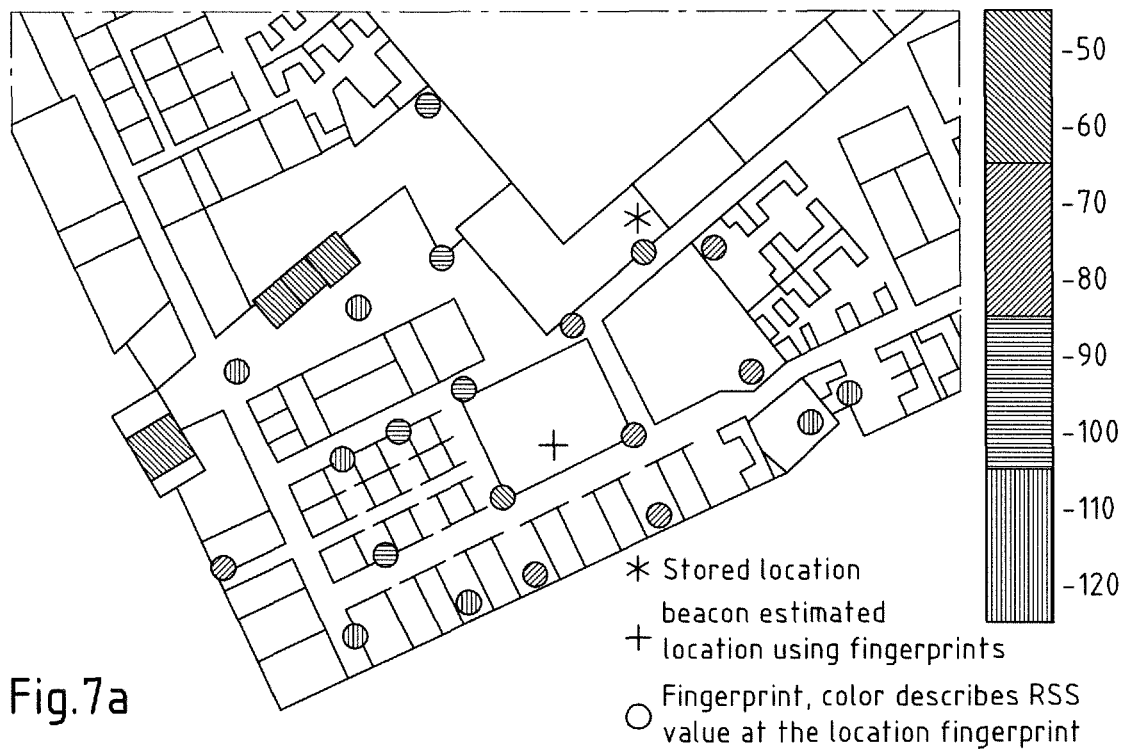
FIG. 7a a map of a venue visualizing a determined position of a respective radio node and an obtained position of the respective radio node according to a stored-location, as used in an example method according to the first exemplary aspect of the present invention.

FIG. 7a shows a map of a venue visualizing a determined position of a respective radio node and an obtained position of the respective radio node according to a stored-location, as used in an example method according to the first exemplary aspect of the present invention.

In contrast to FIG. 5a, FIG. 7a shows a case of the determined position of the respective radio node and the obtained position of the respective radio node according to a stored-location, which does not comply with each other. The two shown stars representing the determined position of the respective radio node and the obtained position of the respective radio node overlap just merely.

Figure 7B:
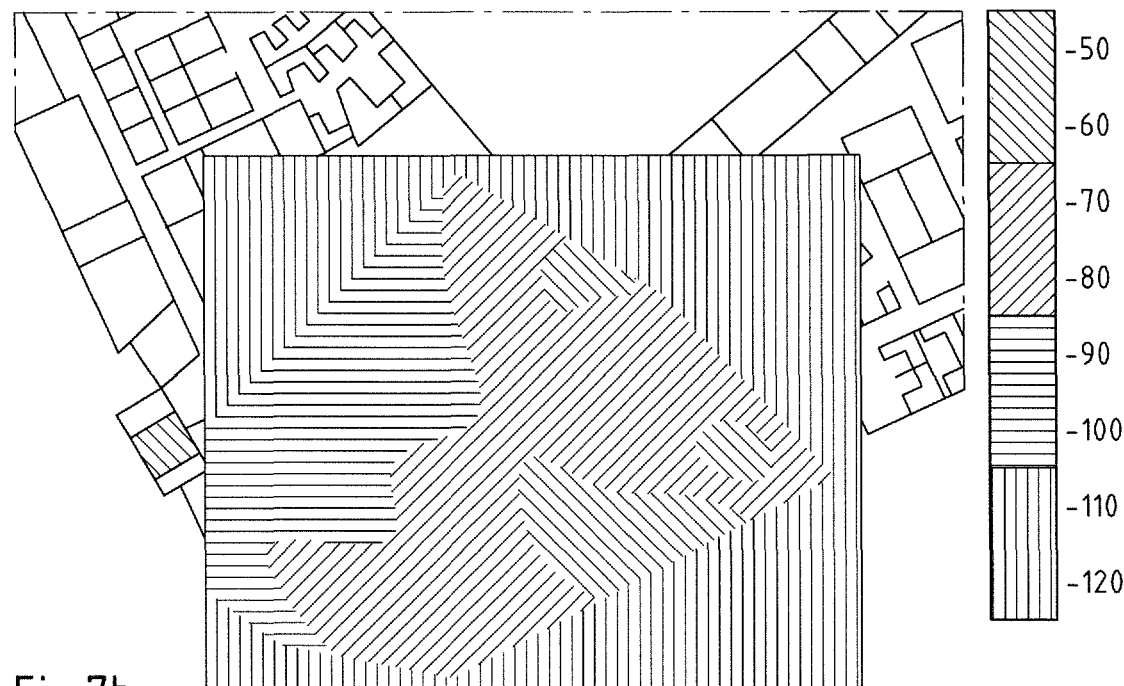
FIG. 7b a radio map of the venue shown in FIG. 7a, as generated by an example method according to the first exemplary aspect of the present invention.

FIG. 7b shows a radio map of the venue shown in FIG. 7a, as generated by an example method according to the first exemplary aspect of the present invention.

The radio map of FIG. 7b shows that the radio map of the respective radio node may have a problem of a displacement of the respective radio node. During the generating of said radio map, the piece of respective position information representing the position of the respective radio node in the venue was not valid.

Figure 8A:
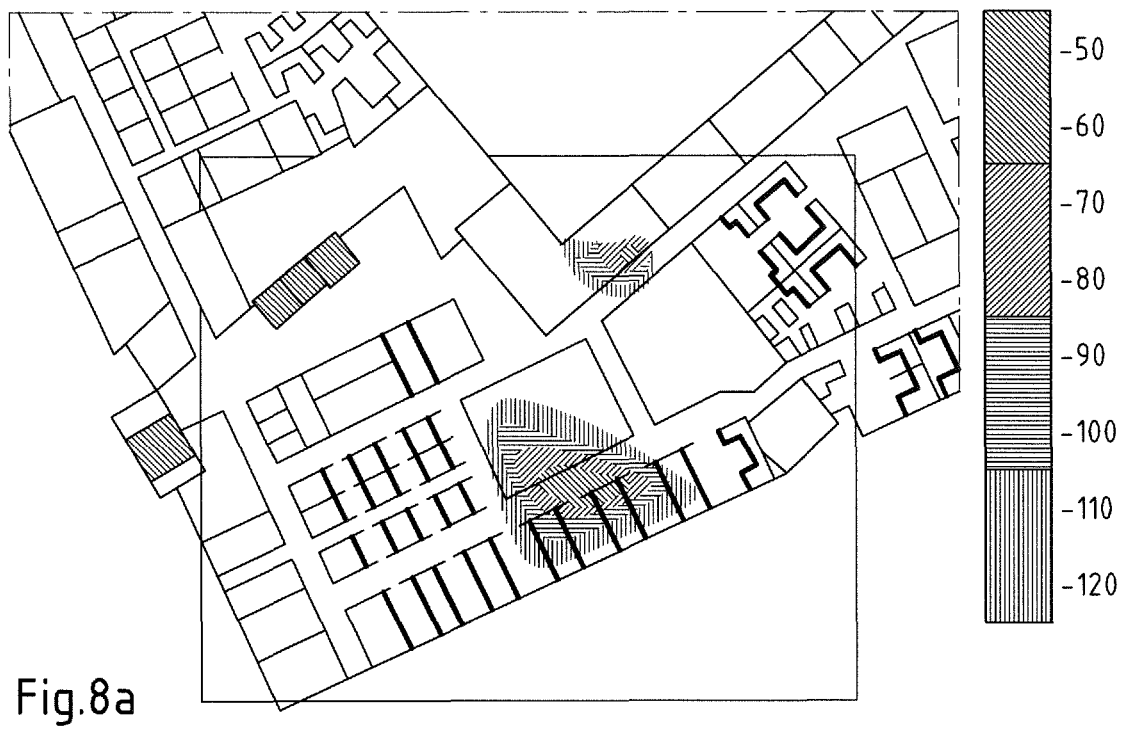
FIG. 8a a result of a likelihood determining of one or more respective received signal strengths values of the one or more respective signals received by the respective radio node, as used in an example method according to the first exemplary aspect of the present invention.

FIG. 8a shows a result of a likelihood determining of one or more respective received signal strengths values of the one or more respective signals received by the respective radio node, as used in an example method according to the first exemplary aspect of the present invention.

High likelihood values, e.g. as determined according to the equation 2 of this specification, are concentrated on two locations respectively position in the venue. This creates ambiguity in indoor positioning and/or floor detection systems. Thus, this may be indicative to a not valid radio map.

Figure 8B:
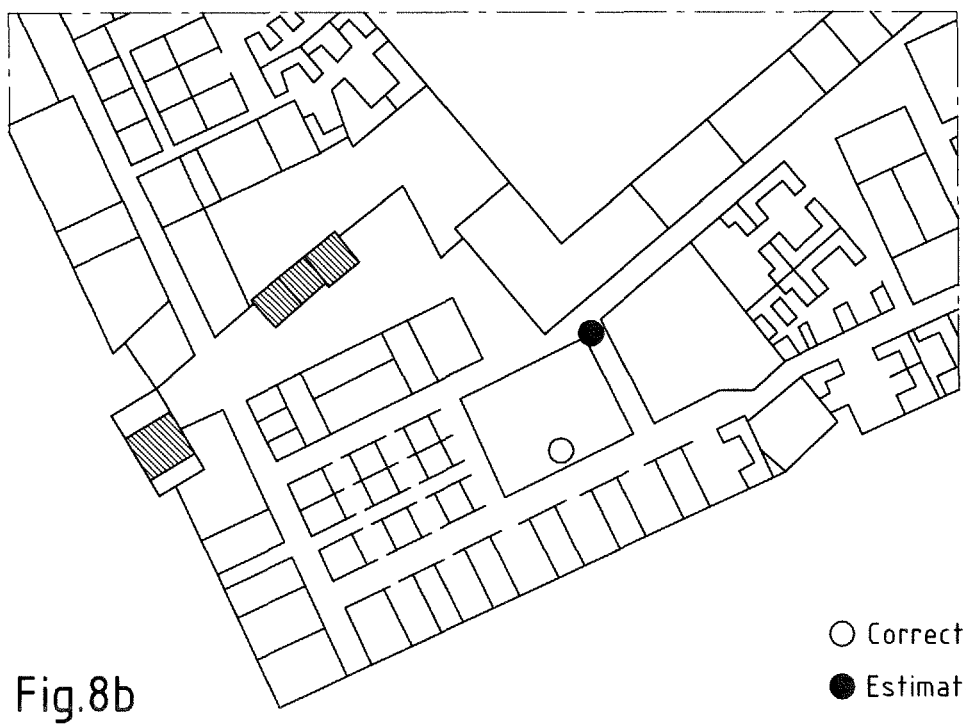
FIG. 8b a map of a venue visualizing a determined position of a respective radio node and an obtained position of the respective radio node according to a stored-location, as used in an example method according to the first exemplary aspect of the present invention.

FIG. 8b shows a map of a venue visualizing a determined position of a respective radio node and an obtained position of the respective radio node according to a stored-location, as used in an example method according to the first exemplary aspect of the present invention.

It is shown in FIG. 8b that the determined position of the respective radio node is about 5 meters away as the stored-location of the respective radio node. The position of said respective radio node (e.g. beacon) was set incorrectly and thus the piece of respective position information representing the position of the respective radio node in the venue stored in the memory is incorrect and not valid.

Figure 9C:
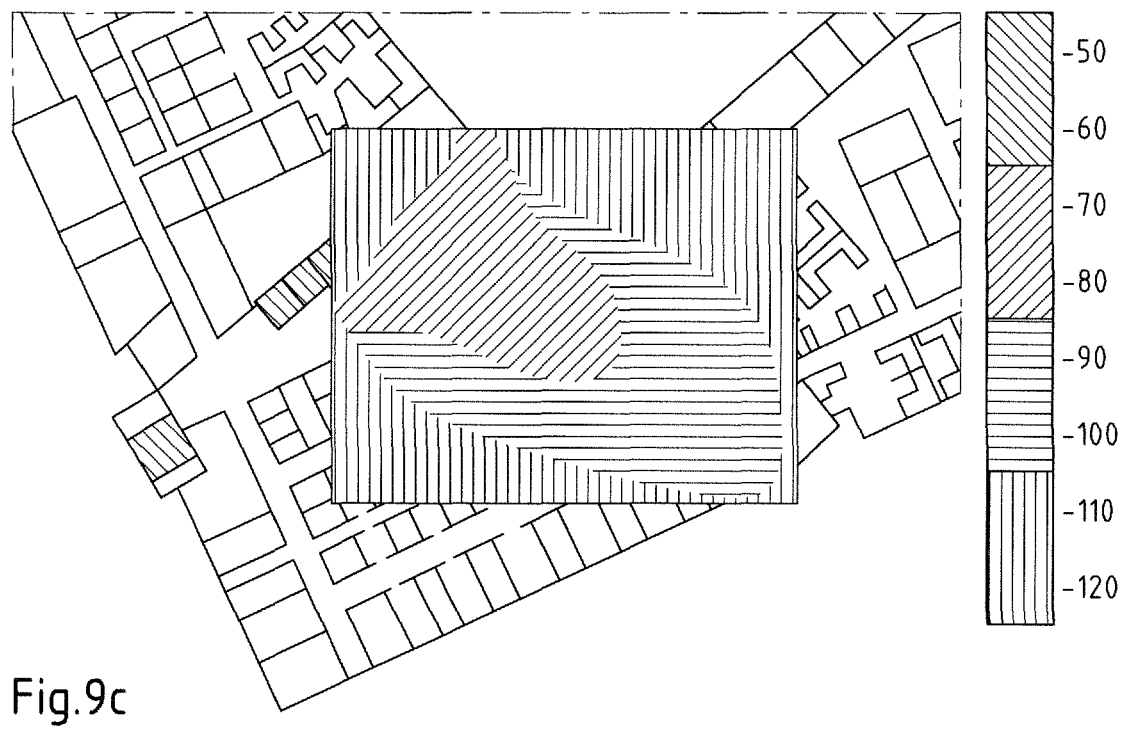
FIG. 9a maps of a venue visualizing a determined position of a respective radio node and an obtained position of the respective radio node according to a stored-location, as used in an example method according to the first exemplary aspect of the present invention.
FIG. 9b radio maps of the venue shown in FIG. 9a, as generated by an example method according to the first exemplary aspect of the present invention.
Figure 9D:
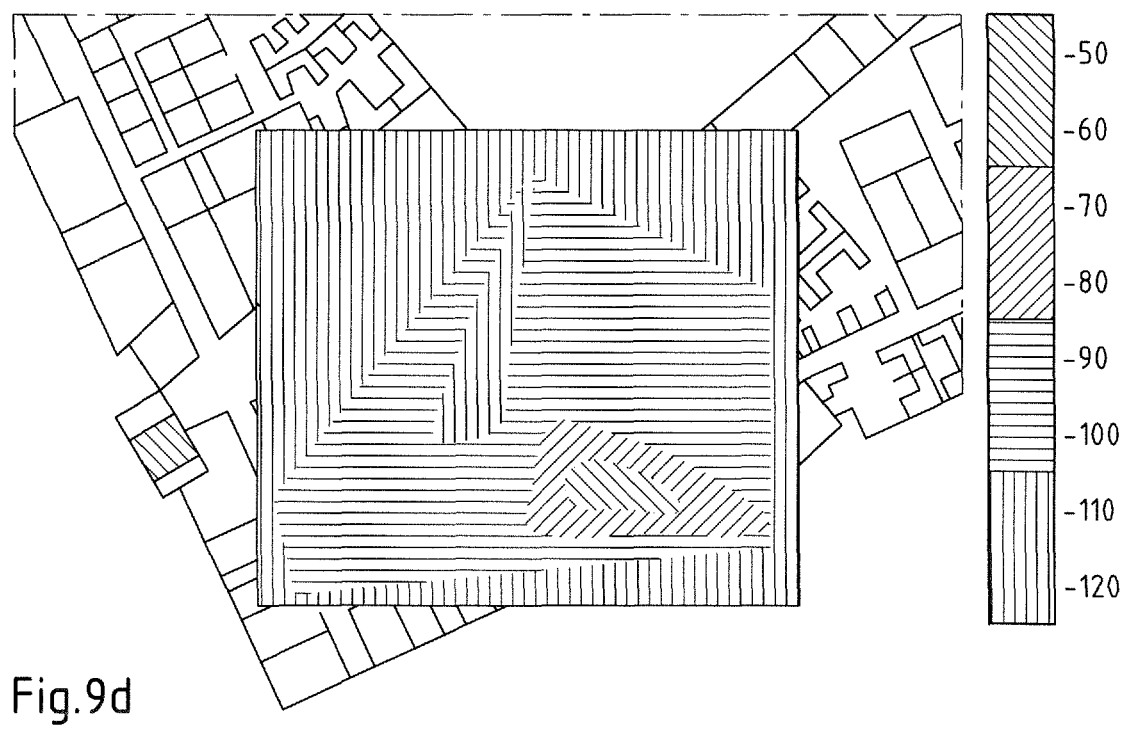

FIG. 9a shows maps of a venue visualizing a determined position of a respective radio node and an obtained position of the respective radio node according to a stored-location, as used in an example method according to the first exemplary aspect of the present invention.

FIG. 9b shows radio maps of the venue shown in FIG. 9a, as generated by an example method according to the first exemplary aspect of the present invention.

FIGS. 9a and 9b show a comparison of before and after updating (e.g. changing) the position of the respective radio node (e.g. beacons) represented by the piece of respective position information stored in a memory.

In FIG. 9a it is shown that after the corrective action (e.g. updating the stored-location and generating a new radio map) the determined position of the respective radio node complies with the obtained position of the respective radio node of the memory.

In FIG. 9b a comparison of the radio maps before and after the updating of the position of the respective radio node to the correct location respectively position of the respective radio node in the venue is shown. It is shown that the radio maps of FIG. 9b are quite different from each other so that positioning performance of indoor positioning and/or floor detection systems can be re-established e.g. in case a radio node in the venue was displaced. Due to the update of the stored-location of the respective radio node a self-correction of the displaced radio node's radio map can be achieved.

The following embodiments shall also be considered to be disclosed:

Radio beacons are used to set up radio infrastructure. Once they are installed, the beacons should not change their locations to obtain best positioning performance.

The beacon displacement problem is common in public venues, airport, universities, etc. This happens because of user interaction with beacons, movement of furniture, etc. Additionally, another reason for beacon displacement is user-error, a user store wrong location of beacon while installation.

The displacement of beacon increases error in position estimation. Radio map of displaced beacon will not match radio measurement during position estimation, which increases error in position estimate.

It is proposed a method which can detect displaced beacons and update radio map of the displaced beacons to prevent degradation in positioning performance.

It is required to use mirror beacon to detect and update the radio maps. A mirror beacon advertises unique address of surrounding beacons and their Received Signal Strength (RSS). These beacons can be used to do mirror beacon fingerprinting. Mirror beacon fingerprinting collect radio measurement with mirror beacon and location of each mirror beacon is stored in a memory while installation of beacon, this location will be referred as stored-location in this specification. A location can be stored in the beacon itself, which it can advertise or it can be stored in positioning system database locally or in cloud.

To solve the problem of displaced beacon, mirror beacon collect real-time fingerprints. An algorithm processes the fingerprints to estimate location of beacons. The estimated location is checked with the stored-location of the beacon to determine if the stored-location is valid. Further, the method according to all aspects of the present invention may be used to update radio map of non-mirror beacon, in that location is first estimated and then stored in the system. If the stored-location of a beacon is valid then its radio map is valid and no update is needed in the radio map. If the stored-location of a beacon is not valid, then beacon has been displaced. The radio map of displaced beacon is not valid; the stored-location should be updated with estimated location and new radio map should be created. The updated radio map improves positioning performance which degrades because of the change of beacon location.

The method according to all aspects of the present invention enables positioning system to self-check and correct itself to provide best performance even if location of a few beacons has been compromised. The method according to all aspects of the present invention assumes that the number of displaced beacons is smaller than the valid beacon.

Further details to detect displaced beacon and its correction are described in the following:

Detection of displaced beacon:

The following steps describe a method to detect displaced beacon:

i) Collect latest fingerprint of a beacon with mirror beacon
ii) Estimate beacon location using latest fingerprints. One exemplary method to estimate location is weighted mean $$\underline{\mu}=E(\underline{x})=\Sigma_{i=1}{}^{N}w_{i}\underline{x}_{i} \quad \text{Equation 1:}$$

Where is $\underline{\mu}$ estimated location; $\underline{x}$ is fingerprint location w is normalized weight, which is dependent on RSS value. High RSS values get more weight than low RSS value.

iii) Compare estimated location with stored-location, if the difference is more than the threshold distance, e.g. 5 meter; stored-location is not valid and beacon is a displaced beacon.

Correction of displaced beacon radio map:

i) Update location of displaced beacon with estimated location
ii) Use latest fingerprint and update radio map of the beacon The implementation is explained by giving three examples of beacons.

i) A beacon with valid stored-location
ii) A beacon with wrong stored-location
iii) A physically displaced beacon These example beacons will be described with help of estimated location using fingerprints, radio map, likelihood calculation and position estimation.

A beacon with valid stored-location:

A beacon with valid stored-location can be described with FIG. 5. FIG. 5 (a) shows estimated location and stored location of valid beacon agrees with each other. FIG. 1 (b) shows radio map created using fingerprints shown in FIG. 5 (a), which shows high RSS values of the beacon is concentrated in one area which is an example of a radio map which do not have problems.

While calculating, position using radio map shown in FIG. 5 (b), measurement from user device will match very well with radio map and position can be estimated with good accuracy. FIG. 6 (a) shows result of likelihood calculation, which shows likelihood of high RSS value is concentrated close to beacon location and FIG. 6 (b) shows estimated position and correct position of a user.

The estimated position is calculated using equation 1 and weights taken from likelihood values. An exemplary method to calculate likelihood value at a location is to use normal likelihood function given in equation 2:

$$\text{Normal likelihood} = \frac{\exp\left(-\frac{(RSS_{radio} - RSS_{meas})^2}{2\delta^2}\right)}{\sqrt{2\pi\delta^2}} \quad \text{Equation 2}$$

where $RSS_{radio}$ is RSS value received at a location in radio map and $RSS_{meas}$ is measured RSS value at user device. Likelihood is calculated all location of radio map. The FIG. 6 (b) shows that position can be estimated very accurately with high RSS value of the beacon and radio map.

Beacon with wrong stored-location:

A beacon transmits wrong location, when location was configured incorrectly or beacon has physically displaced. Behavior of a beacon with incorrect location can be understood with the help of FIG. 7. FIG. 7 (a) shows estimated location do not match with stored-location in the system, difference between the locations is 15 meter. FIG. 7 (b) shows radio map created using fingerprints shown in FIG. 7 (a), which shows high RSS values of the beacon is present in two areas which indicate problem in radio map.

FIG. 8 (a) shows result of likelihood calculation, high likelihood to a high RSS value is present in two areas, which are away from each other. The likelihood values are ambiguous for high RSS value. FIG. 8 (b) shows correction location of a user and estimated position calculated using equation 1 and weights taken from likelihood values, calculated using equation 2, shown in FIG. 8 (a). In the FIG. 8, estimated position is 10 meter away from the correction location. The error of 10 meter is a result of a beacon displacement. By updating the beacon, the error can be corrected. After updating the beacon, the result should be similar as shown in the section of a beacon with valid stored-location.

Displacement non-mirror beacon:

The approach can also be used to correct radio map of non-mirror beacon. FIG. 9 shows an example of a displaced non-mirror beacon and its update with the invention. The detection is done by checking latest estimated position of beacon with previous estimated location stored in the system.

The present invention according to all aspects can achieve the following advantages:

Self-correcting positioning system

Good quality control of positioning system

The system can correct radio map of both mirror beacon and non-mirror beacon

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/ computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method, performed by at least one apparatus, comprising:
    obtaining a piece of respective position information, wherein the piece of respective position information is indicative of a position of a respective radio node in a venue, wherein the piece of respective position information is stored in a memory prior to the obtaining;
    determining the position of the respective radio node in the venue based at least partially on one or more respective radio measurements of one or more further respective radio nodes surrounding the respective radio node and on one or more further respective radio measurements gathered by the respective radio node, wherein one or more respective signals are sent by the one or more respective radio nodes surrounding the respective radio node, and wherein one or more pieces of respective identifier information associated with the one or more respective radio nodes surrounding the respective radio node are comprised by the one or more respective signals sent by the one or more respective radio nodes surrounding the respective radio node;
    determining a piece of respective displacement information based on the obtained piece of respective position information and the determined position of the respective radio node, wherein the piece of respective displacement information is indicative of a displacement of the respective radio node in case the determined position of the respective radio node differs from the position of the respective radio node represented by the obtained piece of position information;
    when it is determined that the piece of respective displacement information indicates that the respective radio node is not displaced, indicating that the piece of respective position information is valid; and
    when it is determined that the piece of respective displacement information indicates that the respective radio node is displaced, at least one of (a) updating the respective position information in the memory based at least in part on the position of the respective radio node in the venue or (b) indicating that the piece of respective position information is invalid.

2. The method according to claim 1, wherein one or more pieces of respective position information of the one or more respective radio nodes are determined based on the one or more pieces of respective identifier information, wherein the respective radio measurements and the piece of respective position information form a respective fingerprint.

3. The method according to claim 2, wherein the position of the respective radio node is determined based on a weighted mean calculation using one or more normalized weights being dependent on at least one respective received signal strengths value of the one or more respective signals received by the respective radio node and the determined one or more pieces of respective position information of the one or more respective radio nodes.

4. The method according to claim 3, wherein the one or more normalized weights are determined based at least partially on one or more respective likelihood values, wherein each respective likelihood value of the one or more respective likelihood values are being indicative of the at least one respective received signal strengths value of the one or more respective signals received by the respective radio node being concentrated at the position of the respective radio node.

5. The method according to claim 1, wherein the method further comprises:
    determining one or more pieces of respective position information of the one or more respective radio nodes, wherein the one or more pieces of respective position information of the one or more respective radio nodes are determined based on the one or more pieces of respective identifier information, wherein the respective radio measurements and the piece of respective position information form a respective fingerprint; and
    generating a radio map based at least partially on the one or more respective fingerprints of the one or more further respective radio nodes surrounding the respective radio node; and
    wherein the position of the respective radio node is determined based at least partially on the generated radio map.

6. The method according to claim 1, wherein the respective radio node is capable of broadcasting one or more respective fingerprints collected by itself.

7. The method according to claim 1, wherein the memory storing the one or more pieces of respective position information of the one or more respective radio nodes of the venue is accessible by the one or more respective radio nodes.

8. The method according to claim 1, wherein the one or more respective radio measurements of the one or more further respective radio nodes surrounding the respective radio node and the one or more pieces of respective position information of the one or more further respective radio nodes form one or more respective fingerprints.

9. The method according to claim 8, wherein at least one respective received signal strengths value of the one or more respective signals received by the respective radio node is determined based at least partially on the one or more respective radio measurements gathered by the respective radio node.

10. The method according to claim 8, wherein the position of the respective radio node in the venue is determined based at least partially on a generated radio map and on the one or more respective radio measurements, wherein the radio map is generated based at least partially on the one or more respective fingerprints.

11. The method of claim 1, wherein the piece of respective displacement information is determined based at least in part on the obtained piece of respective position information, the determined position of the respective radio node, and a threshold value.

12. The method of claim 11, wherein the threshold value is determined based on a variance of the position of the respective radio node.

13. An apparatus comprising at least one processor and at least one memory including computer program code, the at least one memory and the computer program code configured to, with the at least one processor, cause the apparatus to at least perform:
  obtaining a piece of respective position information, wherein the piece of respective position information is indicative of a position of a respective radio node in a venue, wherein the piece of respective position information is stored in a memory prior to the obtaining;
  determining the position of the respective radio node in the venue based at least partially on one or more respective radio measurements of one or more further respective radio nodes surrounding the respective radio node and on one or more further respective radio measurements gathered by the respective radio node, wherein one or more respective signals are sent by the one or more respective radio nodes surrounding the respective radio node, and wherein one or more pieces of respective identifier information associated with the one or more respective radio nodes surrounding the respective radio node are comprised by the one or more respective signals sent by the one or more respective radio nodes surrounding the respective radio node;
  determining a piece of respective displacement information based on the obtained piece of respective position information and the determined position of the respective radio node, wherein the piece of respective displacement information is indicative of a displacement of the respective radio node in case the determined position of the respective radio node differs from the position of the respective radio node represented by the obtained piece of position information;
  when it is determined that the piece of respective displacement information indicates that the respective radio node is not displaced, indicating that the piece of respective position information is valid; and
  when it is determined that the piece of respective displacement information indicates that the respective radio node is displaced, at least one of (a) updating the respective position information in the memory based at least in part on the position of the respective radio node in the venue or (b) indicating that the piece of respective position information is invalid.

14. The apparatus according to claim 13, wherein one or more pieces of respective position information of the one or more pieces of respective radio nodes are determined based on the one or more pieces of respective identifier information, wherein the respective radio measurements and the piece of respective position information form a respective fingerprint.

15. The apparatus according to claim 14, wherein the position of the respective radio node is determined based on a weighted mean calculation using one or more normalized weights being dependent on at least one respective received signal strengths value of the one or more respective signals received by the respective radio node and the determined one or more pieces of respective position information of the one or more respective radio nodes.

16. The apparatus according to claim 15, wherein the one or more normalized weights are determined based at least partially on one or more respective likelihood values, wherein each respective likelihood value of the one or more respective likelihood values are being indicative of the at least one respective received signal strengths value of the one or more respective signals received by the respective radio node being concentrated at the position of the respective radio node.

17. The apparatus according to claim 13, wherein the at least one memory and the computer program code are further configured to, with the at least one processor, cause the apparatus further to perform:
  determining one or more pieces of respective position information of the one or more respective radio nodes, wherein the one or more pieces of respective position information of the one or more respective radio nodes are determined based on the one or more pieces of respective identifier information, wherein the respective radio measurements and the piece of respective position information form a respective fingerprint; and
  generating a radio map based at least partially on the one or more respective fingerprints of the one or more further respective radio nodes surrounding the respective radio node; and
  wherein the position of the respective radio node is determined based at least partially on the generated radio map.

18. The apparatus according to claim 13, wherein the one or more respective radio measurements of the one or more further respective radio nodes surrounding the respective radio node and the one or more pieces of respective position information of the one or more further respective radio nodes form one or more respective fingerprints.

19. The apparatus according to claim 18, wherein at least one respective received signal strengths value of the one or more respective signals received by the respective radio node is determined based at least partially on the one or more respective radio measurements gathered by the respective radio node.

20. A system, comprising:
  at least one apparatus comprising at least one processor and at least one memory including computer program code; and
  one or more radio nodes configured to provide one or more gathered respective radio measurements,
  wherein the at least one memory and the computer program code are configured to, with the at least one processor, cause the apparatus to at least perform:
    obtaining a piece of respective position information, wherein the piece of respective position information is indicative of a position of a respective radio node in a venue, wherein the piece of respective position information is stored in a memory prior to the obtaining;
    determining the position of the respective radio node in the venue based at least partially on one or more respective radio measurements of one or more further respective radio nodes surrounding the respective radio node and on one or more further respective radio measurements gathered by the respective radio node, wherein one or more respective signals are sent by the one or more respective radio nodes surrounding the respective radio node, and wherein one or more pieces of respective identifier information associated with the one or more respective radio nodes surrounding the respective radio node are comprised by the one or more respective signals sent by the one or more respective radio nodes surrounding the respective radio node; and determining a piece of respective displacement information based on the obtained piece of respective position information and the determined position of the respective radio node, wherein the piece of respective displacement information is indicative of a displacement of the respective radio node in case the determined position of the respective radio node differs from the position of the respective radio node represented by the obtained piece of position information;

when it is determined that the piece of respective displacement information indicates that the respective radio node is not displaced, indicating that the piece of respective position information is valid; and when it is determined that the piece of respective displacement information indicates that the respective radio node is displaced, at least one of (a) updating the respective position information in the memory based at least in part on the position of the respective radio node in the venue or (b) indicating that the piece of respective position information is invalid.

* * * * *